United States Patent [19]

Sato et al.

[11] Patent Number: 5,476,624
[45] Date of Patent: Dec. 19, 1995

[54] PROCESS FOR RECLAIMING WASTE PLASTICS HAVING A PAINT FILM

[75] Inventors: Norio Sato; Shigetoshi Sugiyama; Takashi Ohta; Mitsumasa Matsushita; Shoichi Suzuki, all of Aichi; Takeyoshi Nishio; Toshio Yokoi, both of Toyota, all of Japan

[73] Assignees: Kabushiki Kaisha Toyota Chuo Kenkyusho; Toyota-Jidosha Kabushiki Kaisha, both of Japan

[21] Appl. No.: 351,051

[22] Filed: Nov. 28, 1994

Related U.S. Application Data

[63] Continuation of Ser. No. 982,738, filed as PCT/JP92/00847, Jul. 3, 1992, abandoned.

[30] Foreign Application Priority Data

| Jul. 5, 1991 | [JP] | Japan | 3-192431 |
| Dec. 25, 1991 | [JP] | Japan | 3-357843 |
| Dec. 25, 1991 | [JP] | Japan | 3-357844 |
| Feb. 3, 1992 | [JP] | Japan | 4-048000 |
| Mar. 30, 1992 | [JP] | Japan | 4-105536 |

[51] Int. Cl.[6] .............................. B29B 7/66; B29B 7/84
[52] U.S. Cl. .................... 264/83; 264/37; 264/102; 264/141; 264/211.21; 264/349; 264/DIG. 69; 425/DIG. 46
[58] Field of Search .................. 264/37, 101, 102, 264/349, 211.21, DIG. 69, 141, 83; 241/15, 17, 19, 23, DIG. 38; 425/203, DIG. 46; 106/122

[56] References Cited

U.S. PATENT DOCUMENTS

| 4,051,212 | 9/1977 | Grigat et al. | 264/DIG. 69 |
| 4,098,649 | 7/1978 | Redker | 264/349 |
| 4,496,707 | 1/1985 | Liggett | 106/122 |
| 5,215,625 | 1/1993 | Burton | 264/37 |

FOREIGN PATENT DOCUMENTS

| 430199A2 | 6/1991 | European Pat. Off. . | |
| 4033862 | 4/1992 | Germany | 264/37 |
| 4105285 | 8/1992 | Germany | 264/37 |
| 51-52478 | 5/1976 | Japan . | |
| 53-25677 | 3/1978 | Japan | 264/37 |
| 54-70377 | 6/1979 | Japan . | |
| 55-140528 | 11/1980 | Japan | 264/37 |

OTHER PUBLICATIONS

Plastverarbeiter, vol. 42, No. 7, Jul. 1991, Speyer/Rhein.

Technology for Automobile, vol. 46, No. 1, 1992 (pp. 39–46).

*Primary Examiner*—Mathieu D. Vargot
*Attorney, Agent, or Firm*—Finnegan, Henderson, Farabow, Garrett & Dunner

[57] ABSTRACT

A process for reclaiming waste plastics having a paint film which includes subjecting the paint film to a hydrolysis treatment by immersing the waste plastics having a urethane paint film or an amino resin paint film in a treating liquid, or contacting the waste plastics with the vapor of a treating liquid, to decompose the paint into lower molecular weight compounds. The resulting waste plastics are then heated and kneaded to disperse the products of the hydrolysis in the waste plastics, and there is recovered a reclaimed waste plastics product having good mechanical properties.

19 Claims, 5 Drawing Sheets

WAVE NUMBER (cm$^{-1}$)

WAVE NUMBER (cm$^{-1}$)

PROCESS FOR RECLAIMING WASTE PLASTICS HAVING A PAINT FILM

This application is a continuation of application Ser. No. 07/982,738, filed as PCT/JP92/00847, Jul. 3, 1992, now abandoned.

TECHNICAL FIELD

The present invention relates to a process for reclaiming waste plastics having a paint film.

THE BACKGROUND ART

Recently, it has been required to reclaim and reuse waste plastics having a paint film in view of environmental pollution. The paint films made on these waste plastics are not melted by heat or not dissolved by a solvent, because the paint films are bridged and thermoset generally in a three dimensional network structure. To remove the paint films, there is no other process than mechanically cutting away the paint films. Namely, a process is assumed in which the paint films are mechanically removed by sandblasting beforehand and then the waste plastics are pulverized to produce reclaimed resin compositions for molding. This process, however, is not appropriate for industrial use, because it takes a lot of time to remove the paint films in the case of parts having complicated solid surfaces and the paint films cannot be completely removed.

Therefore, as one of the other processes for reclaiming waste plastics having a thermosetting paint film, a process has been conventionally used in which the above waste plastics which has been pulverized is kneaded as it is by a kneading machine such as a multiple spindle extruder in order to produce a reclaimed resin composition for molding. In this process, however, the paint film components are not melted in the kneading machine, and exist as foreign matters in the reclaimed resin composition for molding. Therefore, moldings of the reclaimed resin composition are decreased in mechanical properties. The decrease in the mechanical properties is remarkably shown in impact strength particularly. As a result, there arises a problem that the use of the reclaimed resin composition for molding has to be limited to ones which do not require impact strength.

The present invention has been conceived in view of the above circumstances. It is an object of the present invention to reclaim waste plastics having a paint film without removing the paint film and to produce a reclaimed resin composition for molding which does not have a large decrease in impact strength and which can produce plastic products having approximately equal properties to those of new plastics.

DISCLOSURE OF THE INVENTION

The process for reclaiming waste plastics having a paint film according to the present invention is characterized in that a thermosetting paint film such as an urethane paint film, an amino resin paint film or the like is subjected to hydrolysis treatment (in the present application, hydrolysis means hydrolysis and/or alcoholysis) and then the waste plastics having the paint film is kneaded without removing the paint film to produce a reclaimed resin composition for molding.

The hydrolysis treatment of the paint film is conducted by contacting pulverized waste plastics having a paint film with a treating liquid. Concretely, it is conducted by the following methods. The first method is to immerse pulverized waste plastics having a paint film in a treating liquid and heat it to a temperature not more than a melting point of the plastics having the paint film under ordinary pressure or applied pressure. The second method is to immerse pulverized waste plastics having a paint film in a treating liquid, and heat it to a temperature above a melting point of the plastics having the paint film under ordinary pressure or applied pressure. The third method is to contact pulverized waste plastics having a paint film with vapor of a treating liquid, and heat it to a temperature not more than a melting point of the plastics having the paint film under applied pressure. The fourth method is to contact pulverized waste plastics having a paint film with vapor of a treating liquid, and heat it to a temperature above a melting point of the pulverized waste plastics having the paint film under applied pressure. The fifth method is to feed a treating liquid and pulverized waste plastics having a paint film to a kneading and melting apparatus, and to melt and knead the plastics having the paint film while heating the plastics having the paint film to a temperature above a melting point of the plastics and contacting the plastics having the paint film with the treating liquid, all at the same time. By these methods, the paint film is hydrolyzed into low molecular weight compounds. Therefore, the paint film can be dispersed finely and uniformly in the base resin which constitutes the plastics, with adhering to the base resin or being peeled off from the resin.

The treating liquid which hydrolyzes the paint film may be alcohol or water, or a mixture of alcohol and water. Examples of alcohol are hydrophilic alcohol such as methanol, ethanol, propanol, ethylene glycol, methyl cellosolve, and ethyl cellosolve.

Catalysts such as acids or alkalis which promote hydrolysis reaction can be added to the treating liquid. Examples of acids are inorganic acids such as hydrochloric acid, sulfuric acid, and phosphoric acid, and organic acids such as acetic acid, oxalic acid, and tartaric acid. Examples of alkalis are inorganic bases such as sodium hydroxide and potassium hydroxide, organic salts such as sodium methoxide, metallic salts (zinc chloride, titanium chloride and so on), and activated clay. These catalysts are appropriately selected in accordance with the kind of waste plastics and the application purposes of reclaimed plastics.

Acids or alkalis which act as catalysts are added to the treating liquid in a range from 0.1 to 10% by weight. Metallic salts (zinc chloride, titanium chloride, etc.), organic salts (sodium methoxide), or activated clay should be added in a range from 1 to 10% by weight. When the catalyst amount to be added exceeds the above range, the catalysts remain in the resin composition, which results in decrease in the resin characteristics or requirement of catalyst removing steps. On the other hand, when the catalyst amount is less than the above range, the catalyst performances are not exhibited effectively. Therefore, it is not preferable.

In general, the treating liquid is hot water, water vapor, aqueous solutions including alkali metal hydroxide as a catalyst, aqueous solutions including inorganic acids such as hydrochloric acid or organic acids such as sulfuric acid, alcohol including the above catalysts, or an alcohol-water mixed liquid including the above catalysts.

Waste plastics having a paint film according to the process of the present invention is waste plastics in which a thermosetting urethane paint film or amino resin paint film is formed on the surface of a thermoplastic plastics.

The amino resin paint of the paint film includes alkyd resin, polyester resin, acrylic resin or the like as a principal component, and includes amino resin such as melamine as a curing agent. The urethane paint is a thermosetting paint comprising polyisocyanate resin and polyol resin. The paint films produced by these paints are decomposed into low molecular weight compounds by being subjected to hydrolysis treatment and breaking down their three dimensional network structures. The low molecular weight compounds formed by hydrolysis do not become foreign matters in a reclaimed resin composition for molding, because the low molecular weight compounds are kneaded during molding, and melted or dispersed in the base resin finely and uniformly. Thus, the low molecular weight compounds do not decrease the impact strength of moldings. Besides, the low molecular weight paint components are improved in the affinity with the base resin and dispersed in the base resin finely and uniformly.

The plastics which is to be treated by the reclaiming process according to the present invention is not limited particularly as long as it is a thermoplastic resin. For example, the plastics can be polypropylene, elastomer modified polypropylene, polyethylene, ABS resin, AS resin, polyamide resin, polyester resin, polycarbonate resin, polyacetal resin, polyphenylene oxide, modified polyphenylene oxide (including styrene modified polyphenylene ether) or the like. It is not preferable to use a resin which is weak with hydrolysis treatment.

In this reclaiming process, waste plastics is immersed in a treating liquid comprising water, alcohol, or a mixture thereof or is contacted with vapor of the treating liquid, and heated to a temperature not more than a melting point of the plastics or a temperature above a melting point of the plastics under ordinary pressure or applied pressure. Thereby, the paint film of the waste plastics is hydrolyzed into low molecular weight compounds. In this case, addition of catalysts to the treating liquid promotes hydrolysis reaction.

Any reaction vessel can be used in the hydrolysis step as long as it endures heat and pressure. In view of easy handling, it is appropriate to use a reaction vessel which can be cooled and heated and endures pressure, for example a jacketed autoclave for cooling and heating.

In the case of using a kneading machine such as an extruder, the plastics can be directly made into pellets for molding, and the paint film can be hydrolyzed in the same way as in the case of a pressure vessel, by providing a vent port or a special inlet port and an exhaust port for introducing a treating liquid in a resin melting zone and kneading the molten resin together with the treating liquid. In either case, it is possible to provide moldings which have almost the same impact strength as that of reclaimed plastics having no paint film.

When waste plastics having a paint film is heated to a temperature not more than a melting point of the plastics in the hydrolysis treatment, for example, in the case of polypropylene resin, the temperature is more preferably in a range from 110° C. to 180° C. The paint film can be hydrolyzed in a shorter time in this temperature range than in the treating temperature range from room temperature to 110° C. (not including 110° C.). Thus, the hydrolysis efficiency is enhanced.

When waste plastics is heated to a temperature above a melting point of the plastics, the hydrolysis treatment can be conducted in a much shorter time and hydrolyzed materials are further dispersed in the resin. When plastics is heated to a temperature above a melting point of the plastics, in the case of polypropylene resin, the temperature is preferably in a range from 180° C. to 300° C.

The time for hydrolysis depends on temperature and pressure. When the plastics is heated to a temperature above a melting point of the plastics, the hydrolysis is conducted in a short time, namely, in above five minutes in the existence of catalysts, and in about twenty minutes in no catalyst existence. When the plastics is heated to a temperature not more than a melting point of the plastics, the hydrolysis is conducted in a time from 10 minutes to 2 hours. When the time for hydrolysis is shorter than this range, the paint film is not sufficiently hydrolyzed into low molecular weight compounds and is not well dispersed in the base resin.

When the hydrolysis treatment is conducted under applied pressure, the vessel is rapidly cooled to s certain temperature after the hydrolysis treatment and then the pressure is released from the vessel. This operation stops the reaction of making the paint film into low molecular weight compounds at an appropriate stage, and allows a quick shift to the next step. The temperature at which the reaction is stopped may be 100° C. or less, and is preferably 80° C. or less. It is preferable to reduce the pressure in the reaction vessel at the same time when the temperature is decreased.

After the hydrolysis treatment, the adhered catalysts are removed by washing and the treating liquid adhered to the pulverized resin is removed by drying, if required.

The material subjected to the hydrolysis treatment is made into pellets to produce a resin composition for molding by an ordinary kneading machine such as single spindle kneading machine, a twin spindle kneading machine, or a kneader.

In kneading and pelletizing the pulverized material, the base resin is heated to be softened and melted and further mixed mechanically, whereby the low molecular weight compounds made from the paint film are mixed uniformly and dispersed in the resin composition for molding. The low molecular weight paint film are no longer foreign matters. The low molecular weight paint film is taken into the resin structure and melted together with the resin, whereby the whole waste plastics becomes an integral composition.

The reclaimed resin composition for molding can be used by molding as it is, and besides, it can be used by adding an appropriate amount of the composition to a new material of the same kind.

In the process for reclaiming waste plastics having a paint film according to the present invention, the paint film having three dimensional network structure is hydrolyzed to have low molecular weight. Therefore, the obtained reclaimed resin composition for molding can maintain the dynamic strength of the reclaimed resin, because the hydrolyzed paint film has low molecular weight and is dispersed finely in the reclaimed resin composition for molding and does not exist as foreign matters. Therefore, the reclaimed resin composition for molding made by hydrolyzing the paint film by this process can have equal dynamic properties to those of the reclaimed material made from waste plastics having no paint film. As a result, the reclaimed resin composition for molding can be used in many fields.

According to the process of the present invention, because impact strength is not decreased even if the hydrolyzed paint film is not removed, a step of peeling off a paint film is no longer required and reclaiming steps can be simplified.

The fact that this hydrolysis treatment makes a paint film into low molecular weight compounds was confirmed by infrared spectrophotometry, liquid chromatography and so on. For example, in the case of alkyd-melamine resin, as indicated by chemical formula (1), the bridging point of the paint film (dimethyl ether bond) is cut off and the alkyd-melamine resin is hydrolyzed into melamine resin and alkyd resin which are raw materials and have low molecular weight.

This was confirmed by the fact that the infrared absorption spectrum of the extracted components from the alkyd-melamine resin after the hydrolysis step and that of the alkyd resin component showed the same pattern (See FIG. 7 and FIG. 8) and the fact that the molecular weight distribution of the both components obtained by liquid chromatography was almost the same.

When the alkyd resin is further subjected to hydrolysis treatment, ester bond in the alkyd resin is cut off to produce much lower molecular weight compounds.

In the meanwhile, when the melamine resin is further subjected to hydrolysis treatment, dimethyl ether bond which is the bridging point is hydrolyzed, and at the same time N-methylene bond in the molecule is hydrolyzed to generate methylol group and amino group. It is assumed that when these are further made into lower molecular weight compounds, finally water soluble melamine molecule generates and dissolves.

In the case where plastics having a paint film is melted and kneaded as it is without being treated by the process of the present invention, the paint film remains as large foreign matters and sharply decreases the impact strength of moldings of the reclaimed waste plastics, as shown by a particle structure photograph of the broken-out section of an impact test specimen in FIG. 5. On the other hand, when the plastics having a paint film is treated by the process of the present invention, the paint film of about several micrometers which has low molecular weight is finely and uniformly dispersed in the resin. The observation indicates that, to say the least of it, the paint film which becomes to have low molecular weight does not damage the impact characteristics of the resin, in the same way as what is called rubber modified resin in which rubber is finely dispersed in resin so as to improve impact characteristics.

BEST MODES FOR CARRYING OUT THE INVENTION

Figure 1:
[FIG. 1] This drawing is a microphotograph of a particle structure of a broken-out section of a molding of Example No.42 which was molded after hydrolysis treatment and then subjected to an impact test.

Hereinafter, the process for reclaiming waste plastics having a paint film will be concretely described by way of preferred embodiments.
The First Preferred Embodiment]<with water, no catalyst, not more than a melting point of plastics>

Waste elastomer modified polypropylene resin having a polyester-melamine paint film was pulverized into about 5×5×5 mm cube by a hammer mill. The pulverized material was hydrolyzed under the following conditions.
(No.1)

The pulverized material was immersed in hot water of 100° C. in a glass bottle for 10 hours, thereby conducting hydrolysis treatment. The hydrolyzed material was dried by a vacuum dryer to produce a reclaimed resin composition for molding. In this state, a part of the hydrolyzed paint film was adhered to the surface of the plastics.

The hydrolyzed material was melted and kneaded into pellets by using a NRII type 36 mm one direction high speed rotational vent twin spindle extruder produced by Nakatani Kikai Co., Ltd. A rectangle test specimen of 63 mm×12 mm×6 mm was molded from the pellets by an injection molding machine. The test specimen was notched and subjected to an Izod impact test (according to ASTM D256, the following impact tests were also according to the same rule).

The Izod impact strength of the obtained reclaimed resin was 54 kgfcm/cm$^2$. The moldability of the reclaimed resin was equal to that of a new material. No part of the paint film was visually observed on the surface of the molding, and the molding had equal surface quality to that of a new material molding.
(No.2)

An autoclave apparatus having the capacity of 2100 liters and an agitator (the maximum speed: 60 rpm) was used, and 400 liters of water were introduced into the autoclave and heated to 80° C. Then, 200 kg of pulverized waste elastomer modified polypropylene resin having a polyester-melamine paint film were fed to the autoclave. After sealing the autoclave, the inner temperature of the autoclave was increased from 80° C. to 180° C. while agitating the pulverized material, and the pressure of 11 atm was applied. The pulverized material was held at 180° C. under the pressure for ten minutes. Then, the pulverized material was gradually cooled, and water vapor in the autoclave was flown out to a condenser and the autoclave was opened to the atmospheric air. Then, the pulverized material was taken out of the autoclave.

The hydrolyzed pulverized resin was molded into a rectangle test specimen of 63×12×6 mm in the same way as Example No.1. The test specimen was notched and subjected to an Izod impact test. The Izod impact strength of the obtained reclaimed resin was 56 kgfcm/cm$^2$. The moldability of the reclaimed resin was equal to that of a new material. No part of the paint film was visually observed on the surface of the molding and the molding had equal surface quality to that of a new material molding.
(No.3)

400 liters of water were introduced into the autoclave and heated to 80° C. Then 100 kg of pulverized elastomer modified polypropylene resin having a polyester-melamine paint film were fed to the autoclave. After sealing the autoclave, the inner temperature of the autoclave was increased from 80° C. to 150° C. while agitating the pulverized material, and the pressure of 5 arm was applied. The pulverized material was held at 150° C. under the pressure for sixty minutes. Then the pulverized material was gradually cooled and water vapor in the autoclave was flown out to a condenser and the autoclave was opened to the atmospheric air. Then, the pulverized material was taken out of the autoclave.

Figure 3:
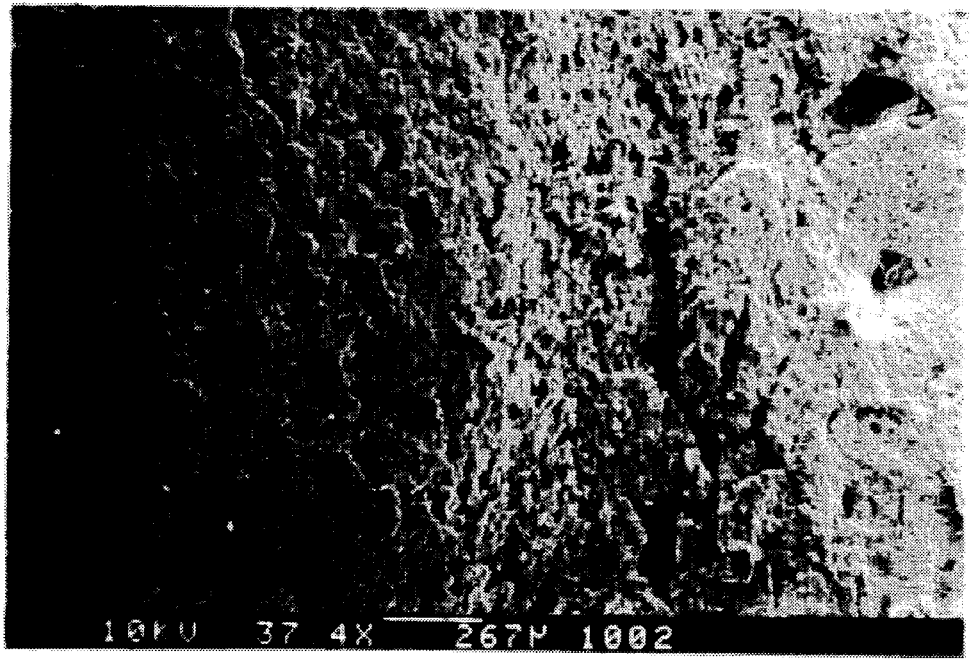
[FIG. 3] This drawing is a microphotograph of a particle structure of a broken-out section of a molding of Example No.4 which was molded after hydrolysis treatment and then was subjected to an impact test.
Figure 4:
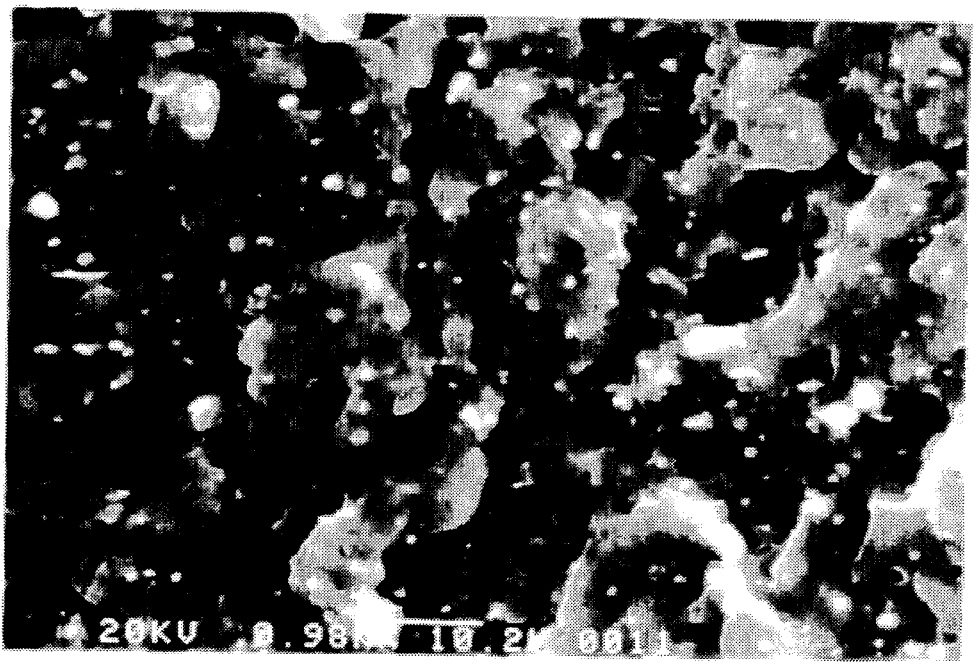
[FIG. 4] This drawing is a microphotograph of a particle structure of a broken-out section of a molding of Example No.3 which was molded after hydrolysis treatment and then subjected to an impact test.

The hydrolyzed pulverized resin was made into a specimen for an impact strength test in the same way as Example No.1. The Izod impact strength of the obtained reclaimed resin was 56 kgfcm/cm². The moldability of the reclaimed resin was equal to that of a new material. No part of the paint film was visually observed on the surface of the molding. The molding had equal surface quality to that of a new material molding. A microphotograph of a particle structure of a broken-out section of the test specimen after the impact test is shown in FIG. 4. The scale of enlargement of this microphotograph is smaller than those of microphotographs shown in FIG. 1 to FIG. 3, but this shows a uniformly dispersed state.

(No.4)

400 liters of water was introduced into the autoclave and heated to 80° C. Then 100 kg of waste elastomer modified polypropylene resin having a polyester-melamine paint film was fed to the autoclave. After sealing the autoclave, the inner temperature of the autoclave was increased from 80° C. to 150° C. while agitating the pulverized material and the pressure of 5 atm was applied. The pulverized material was held at 150° C. under the pressure for sixty minutes. Then the pulverized material was rapidly cooled to 80° C. and the autoclave was opened to the atmospheric air, thereby stopping the hydrolysis reaction. Then, the pulverized material was taken out of the autoclave. The hydrolyzed pulverized resin was made into a test specimen for an impact test in the same way as Example No.1. The Izod impact strength of the obtained reclaimed resin was 57 kgfcm/cm². The moldability of the reclaimed resin was equal to that of a new material. No part of the paint film was visually observed on the surface of the molding, and the molding had equal surface quality to that of a new material molding. A microphotograph of a particle structure of a broken-out section of the test specimen after the impact test is shown in FIG. 3. As shown in the photograph, the resin is uniform and no foreign matter exists.

(No.5)

100 kg of pulverized waste elastomer modified polypropylene resin having a polyester-melamine paint film were fed to the autoclave. Then 400 liters of hot water at 80° C. were introduced, and the autoclave was left as it was for thirty minutes. Thus, the waste material was well preheated. After sealing the autoclave, the inner temperature of the autoclave was increased from 80° C. to 150° C. while agitating the pulverized material, and the pressure of 5 atm was applied. The pulverized material was held at 150° C. under the pressure for sixty minutes. Then the pulverized material was gradually cooled, and water vapor in the autoclave was flown out to a condenser and the autoclave was opened to the atmospheric air. Then the pulverized material was taken out. A specimen for an impact test was produced from the hydrolyzed pulverized material in the same way as Example No. 1. The Izod impact strength of the obtained reclaimed resin was 57 kgfcm/cm². The moldability of the reclaimed resin was equal to that of a new material. No part of the paint film was visually observed on the surface of the molding, and the molding had equal surface quality to that of a new material molding.

(No. 6)

400 liters of water were introduced into the autoclave and heated to 80° C. Then 100 kg of pulverized waste elastomer modified polypropylene resin having an acryl-melamine paint film were fed to the autoclave. After sealing the autoclave, the inner temperature of the autoclave was increased from 80° C. to 150° C. while agitating the pulverized material, and the pressure of 5 atm was applied. The pulverized material was held at 150° C. under the pressure for sixty minutes, and then gradually cooled. After that, water vapor in the autoclave was flown out to a condenser and the autoclave was opened to the atmospheric air. Then the pulverized material was taken out. A specimen for an impact test was produced from the hydrolyzed pulverized resin in the same way as Example No. 1. The Izod impact strength of the obtained reclaimed resin was 56 kgfcm/cm². The moldability of the reclaimed resin was equal to that of a new material. No part of the paint film was visually observed on the surface of the molding, and the molding had equal surface quality to that of a new material molding.

(No.7)

400 liters of water were introduced into the autoclave and heated to 80° C. Then 100 kg of waste elastomer modified polypropylene resin having an acryl-melamine paint film were fed to the autoclave. After sealing the autoclave, the inner temperature of the autoclave was increased from 80° C. to 150° C. while agitating the pulverized material, and the pressure of 5 atm was applied. The pulverized material was held at 150° C. under the pressure for sixty minutes. Then, the pulverized material was rapidly cooled to 80° C. and the autoclave was opened to the atmospheric air, thereby stopping the reaction. Then, the pulverized material was taken out of the autoclave. A specimen for an impact test was produced from the hydrolyzed pulverized resin in the same way as Example No. 1. The Izod impact strength of the obtained reclaimed resin was 57 kgfcm/cm². The moldability of the reclaimed resin was equal to that of a new material. No part of the paint film was visually observed on the surface of the molding, and the molding had equal surface quality to that of a new material molding.

(No.8)

400 liters of water were introduced into the autoclave and heated to 80° C. Then 100kg of pulverized waste elastomer modified polypropylene resin having an acryl-melamine paint film were fed to the autoclave. After sealing the autoclave, the inner temperature of the autoclave was increased from 80° C. to 130° C. while agitating the pulverized material, and the pressure of 3 atm was applied. The pulverized material was held at 130° C. under the pressure for sixty minutes. After that, the pulverized material was gradually cooled, and then the autoclave was opened to thee atmospheric air, thereby stopping the reaction. Then, the pulverized material was taken out of the autoclave. A specimen for an impact test was produced from the hydrolyzed pulverized material in the same way as Example No. 1. The Izod impact strength of the obtained reclaimed resin was 55 kgfcm/cm². The moldability of the reclaimed resin was equal to that of a new material. No part of the paint film was visually observed on the surface of the molding, and the molding had equal surface quality to that of a new material molding.

(No. 9)

400 liters of water were introduced to the autoclave, and heated to 80° C. Then, 100 kg of pulverized waste polypropylene resin having an urethane paint film were fed to the autoclave. After sealing the autoclave, the inner temperature of the autoclave was increased from 80° C. to 150° C. while agitating the pulverized material, and the pressure of 5 atm was applied. The pulverized material was held at 150° C. under the pressure for sixty minutes. After that, the pulverized material was gradually cooled, and then the autoclave was opened to the atmospheric air, thereby stopping the reaction. Then, the pulverized material was taken out of the autoclave. A specimen for an impact test was produced from the hydrolyzed pulverized resin in the same way as Example No. 1. The Izod impact strength of the obtained reclaimed resin was 56 kgfcm/cm$^2$. The moldability of the reclaimed resin was equal to that of a new material. No part of the paint film was visually observed on the surface of the molding, and the molding had equal surface quality to that of a new material molding.

(No. 10)

400 liters of water were introduced into the autoclave, and heated to 80° C. Then, 100 kg of pulverized waste elastomer modified polypropylene resin having an urethane paint film were fed to the autoclave. After sealing the autoclave, the pulverized material was heated from 80° C. to 150° C. in a hot water bath while being agitated and the pressure of 5 atm was applied. The pulverized material was held at 150° C. under the pressure for sixty minutes. Then the pulverized material was rapidly cooled to 80° C. and the autoclave was opened to the atmospheric air, thereby stopping the reaction. Then the pulverized material was taken out of the autoclave. A specimen for an impact test was produced from the hydrolyzed pulverized resin in the same way as Example No. 1.

The Izod impact strength of the obtained reclaimed resin was 57 kgfcm/cm$^2$. The moldability of the reclaimed resin was equal to that of a new material. No part of the paint film was visually observed on the surface of the molding, and the molding had equal surface quality to that of a new material molding.

(No. 11)

400 liters of water were introduced into the autoclave and heated to 80° C. Then 100 kg of pulverized waste elastomer modified polypropylene having an urethane paint film was fed to the autoclave. After sealing the autoclave, the waste pulverized material was heated from 80° C. to 130° C. in a hot water bath while being agitated, and the pressure of 3 atm was applied. The pulverized material was held at 130° C. under the pressure for sixty minutes. After that, the pulverized material was gradually cooled and then the autoclave was opened to the atmospheric air. Then, the pulverized material was taken out of the autoclave. A specimen for an impact test was produced from the hydrolyzed pulverized resin in the same way as Example No. 1. The Izod impact strength of the obtained reclaimed resin was 57 kgfcm/cm$^2$. The moldability of the reclaimed resin was equal to that of a new material. No part of the paint film was visually observed on the surface of the molding, and the molding had equal surface quality to that of a new material molding.

[Comparative Examples]

(No. R1)

Figure 5:
[FIG. 5] This drawing is a microphotograph of a particle structure of a broken-out section of a molding of Comparative Example No. R1 which was molded without any hydrolysis treatment and was subjected to an impact test.
Figure 6:
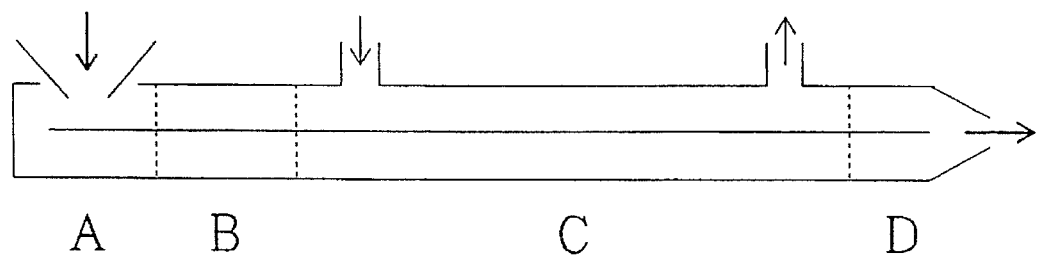
[FIG. 6] This drawing is a cross sectional view of a melting and kneading apparatus.
Figure 7:
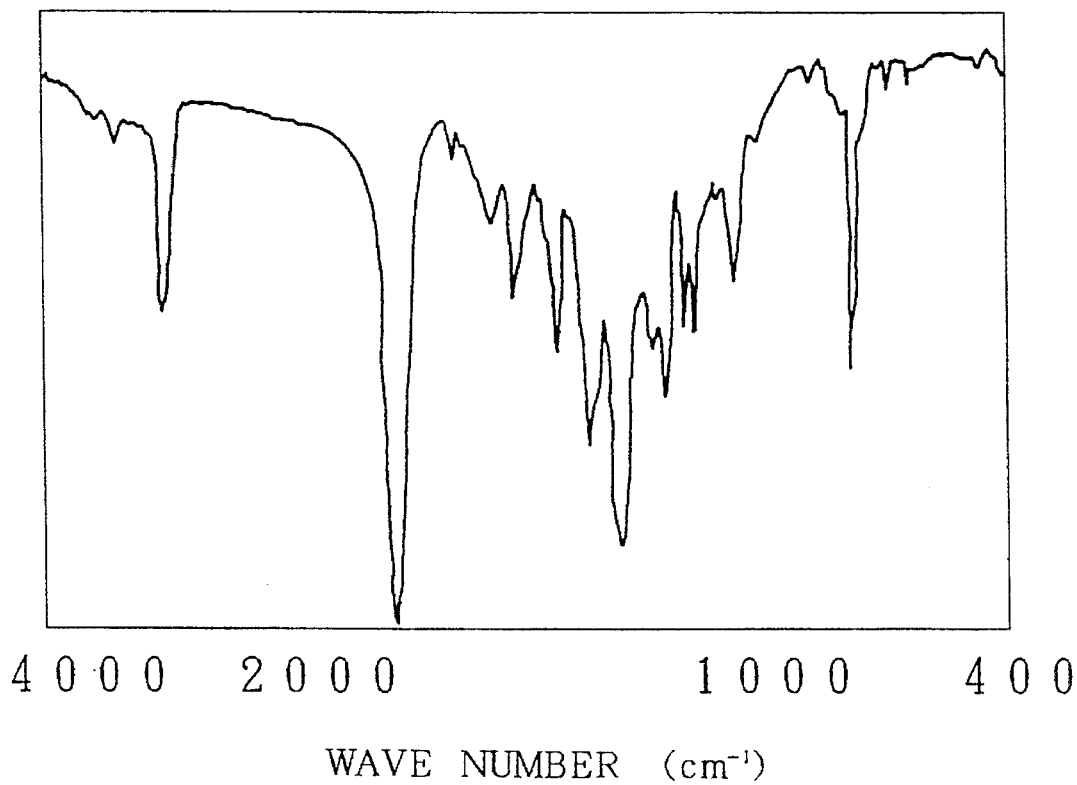
[FIG. 7] This drawing is a line drawing which shows infrared absorption spectrum of an alkyd resin component in an alkyd-melamine paint film which was subjected to hydrolysis treatment.
Figure 8:
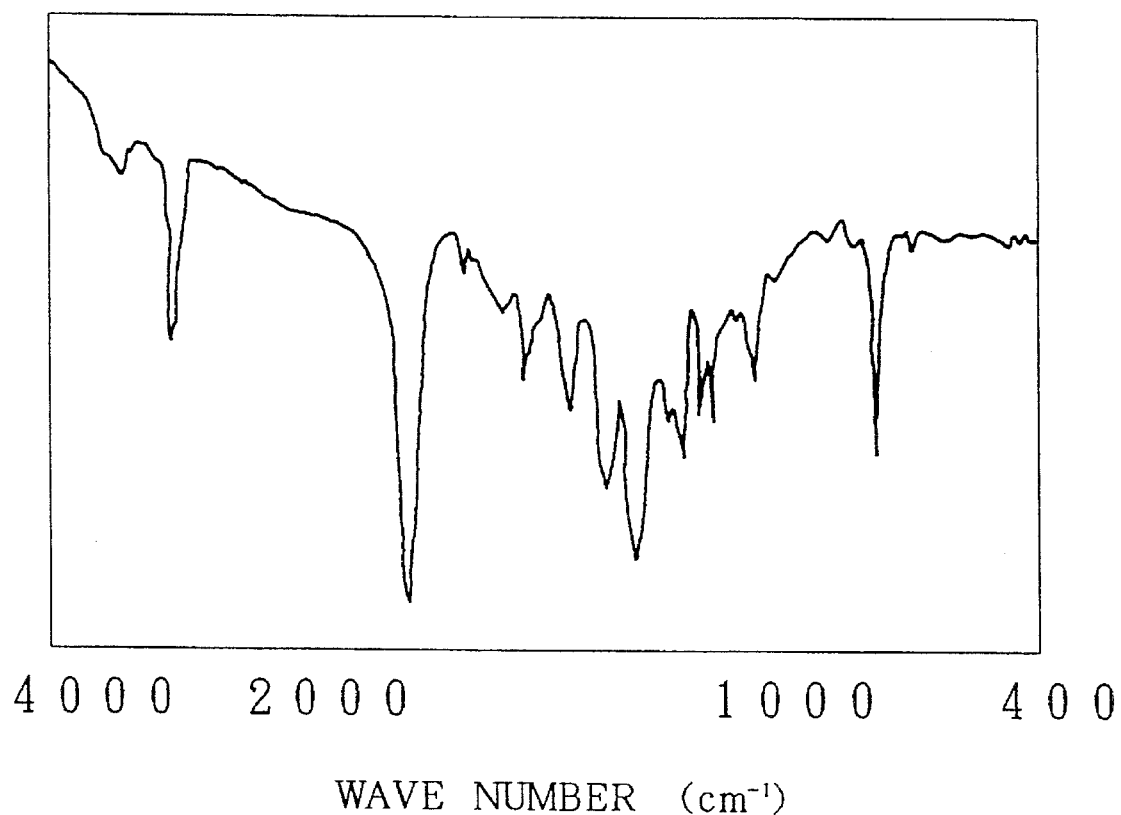
[FIG. 8] This drawing is a line drawing which shows infrared absorption spectrum of an alkyd resin used as a raw material.

A specimen for an impact test was produced by molding the pulverized material used in the First Preferred Embodiment 1 as it was without subjected to hydrolysis treatment. The impact strength was 38 kgfcm/cm$^2$. A microphotograph of a particle structure of a broken-out section of the specimen after this impact test is shown in FIG. 5. As shown in the microphotograph, the resin layer included foreign matters and did not have a uniform structure.

(No. R2)

Waste elastomer modified polypropylene resin having no paint film was pulverized in the same way as in the First Preferred Embodiment 1 and molded as it was in the same way as Example No. 1 to produce a specimen for an impact test. The impact strength was 56 kgfcm/cm$^2$.

(No. R3)

The pulverized material of Comparative Example No. R1 was made into pellets by using an extruder without hydrolysis treatment. Then, a specimen for an impact test was produced from the pellets in the same way as Example No. 1. The impact strength was 38 kgfcm/cm$^2$.

The respective examples of the first preferred embodiment showed impact strength on the same level as that of Comparative Example No. R2, which was the reclaimed material including no paint film. The results are shown in Table 1.

[The Second Preferred Embodiment]
<with water and catalysts, not more than a melting point of plastics>

Waste elastomer modified polypropylene resin having a polyester-melamine paint film was pulverized in the same way as in the first preferred embodiment. The pulverized material was hydrolyzed by using a treating liquid including the following catalysts.

(No. 12)

The above pulverized material was immersed in glacial acetic acid at room temperature for six hours, and then washed with water and vacuum dried, thereby producing a hydrolyzed material. The hydrolyzed material was made into pellets in the same way as Example No. 1. A specimen was produced by injection molding the pellets and subjected to an impact test.

The Izod impact strength of the obtained reclaimed resin was 55 kgfcm/cm$^2$. The moldability of the reclaimed resin was equal to that of a new material. No part of the paint film was visually observed on the surface of the molding, and the molding had equal surface quality to that of a new material molding.

(No. 13)

The pulverized material was immersed in glacial acetic acid at 80° C. for two hours, and then washed with water and vacuum dried, thereby producing a reclaimed resin composition for molding. The composition was made into pellets in the same way as Example No. 1. A specimen was produced by injection molding the pellets and subjected to an impact test.

The Izod impact strength of the obtained reclaimed resin was 56 kgfcm/cm$^2$. The moldability of the reclaimed resin was equal to that of a new material. No part of the paint film was visually observed on the surface of the molding, and the molding had equal surface quality to that of a new material molding.

(No. 14)

The pulverized material was immersed in a 5% hydrochloric acid aqueous solution at room temperature for six hours, and then washed with water and vacuum dried, thereby producing a reclaimed resin composition for molding. The composition was made into pellets in the same way as Example No. 1. A specimen was produced by injection molding the pellets and subjected to an impact test.

The Izod impact strength of the obtained reclaimed resin was 54 kgfcm/cm$^2$. The moldability of the reclaimed resin was equal to that of a new material. No part of the paint film was visually observed on the surface of the molding, and the molding had equal surface quality to that of a new material molding.

(No. 15)

The pulverized material was immersed in a 5% hydrochloric acid aqueous solution at 80° C. for two hours, and then washed with water and vacuum dried, thereby producing a reclaimed resin composition for molding. The composition was made into pellets in the same way as Example No. 1. A specimen was produced by injection molding the pellets and subjected to an impact test.

The Izod impact strength of the obtained reclaimed resin was 55 kgfcm/cm². The moldability of the reclaimed resin was equal to that of a new material. No part of the paint film was visually observed on the surface of the molding and the molding had equal surface quality to that of a new material molding.

(No. 16)

The pulverized material was immersed in a 5% sodium hydroxide aqueous solution at 80° C. for two hours, and then washed with water and vacuum dried, thereby producing a reclaimed resin composition for molding. The composition was made into pellets in the same way as Example No. 2. A specimen was produced by injection molding the pellets and subjected to an impact test.

The Izod impact strength of the obtained reclaimed resin was 56 kgfcm/cm². The moldability of the reclaimed resin was equal to that of a new material. No part of the paint film was visually observed on the surface of the molding, and the molding had equal surface quality to that of a new material molding.

The results are shown in Table 1. The resin compositions which were reclaimed by subjecting waste elastomer modified plastics having the paint films to hydrolysis treatment had higher impact strength than 38 kgfcm/cm² of Comparative Example Nos. RI and R3 which were reclaimed materials with no hydrolysis treatment. The reclaimed compositions had almost the same impact strength as 56 kgfcm/cm² of Comparative Example No. R2 which was a reclaimed resin including no paint film. This is believed to be because the hydrolyzed paint films are finely dispersed in the resins.

[The Third Preferred Embodiment]

<with water under pressure, with catalysts, not more than a melting point of plastics>

(No. 17)

400 liters of a 5 weight % hydrochloric acid aqueous solution was introduced into the autoclave and heated to 80° C. Then 100 kg of pulverized waste elastomer modified polypropylene resin having a polyester-melamine paint film was fed to the autoclave. After sealing the autoclave, the pulverized waste material was heated from 80° C. to 150° C. in a hot water bath while being agitated, and the pressure of 5 atm was applied. The autoclave was held at 150° C. under the pressure for thirty minutes. Then, the autoclave was rapidly cooled to 80° C. and opened to the atmospheric air, thereby stopping the reaction. Then the pulverized material was taken out of the autoclave. A specimen was produced from the hydrolyzed pulverized material in the same way as Example No. 1.

The Izod impact strength of the obtained reclaimed resin was 57 kgfcm/cm². The moldability of the reclaimed resin was equal to that of a new material. No part of the paint film was visually observed on the surface of the molding, and the molding had equal surface quality to that of a new material molding.

(No. 18)

400 liters of water including activated clay by 4% by weight were introduced into the autoclave and heated to 80° C. Then 100 kg of pulverized waste elastomer modified polypropylene resin having a polyester-melamine paint film was fed to the autoclave. After sealing the autoclave, the pulverized waste material was heated from 80° C. to 150° C. in a hot water bath while being agitated, and the pressure of 5 atm was applied. The autoclave was held at 150° C. under the pressure for thirty minutes, and then gradually cooled and opened to the atmospheric air. Then the pulverized material was taken out of the autoclave. A specimen was produced from the hydrolyzed pulverized material in the same as Example No. 1 and subjected to an impact test.

The Izod impact strength of the obtained reclaimed resin was 57 kgfcm/cm². The moldability of the reclaimed resin was equal to that of a new material. No part of the paint film was visually observed on the surface of the molding, and the molding had equal surface quality to that of a new material molding.

(No. 19)

400 liters of water including zinc chloride by 5% by weight were introduced into the autoclave, and heated to 80° C. Then 100 kg of pulverized waste elastomer modified polypropylene resin having a polyester-melamine paint film were fed to the autoclave. After sealing the autoclave, the pulverized waste material was heated in a hot bath from 80° C. to 150° C. while being agitated, and the pressure of 5 atm was applied. The autoclave was held at 150° C. under the pressure for thirty minutes, and then gradually cooled. After that, the autoclave was opened to the atmospheric air, and the pulverized material was taken out of the autoclave. A specimen was produced from the hydrolyzed pulverized resin in the same way as Example No. 1 and subjected to an impact test.

The Izod impact strength of the obtained reclaimed resin was 54 kgfcm/cm². The moldability of the reclaimed resin was equal to that of a new material. No part of the paint film was visually observed on the surface of the molding, and the molding had equal surface quality to that of a new material molding.

(No. 20)

400 liters of water including sodium methoxide by 5% by weight were introduced into the autoclave and heated to 80° C. Then 100 kg of pulverized waste elastomer modified polypropylene resin having a polyester-melamine paint film were fed to the autoclave. After sealing the autoclave, the pulverized waste material was heated from 80° C. to 130° C. in a hot bath while being agitated, and the pressure of 3 atm was applied. The autoclave was held at 130° C. under the pressure for sixty minutes, and then gradually cooled. After that, the autoclave was opened to the atmospheric air, and the pulverized material was taken out of the autoclave. A specimen was produced from the hydrolyzed pulverized resin in the same way as Example No. 1 and subjected to an impact test.

The Izod impact strength of the obtained reclaimed resin was 56 kgfcm/cm². The moldability of the reclaimed resin was equal to that of a new material. No part of the reclaimed material was visually observed on the surface of the molding, and the molding had equal surface quality to that of a new material molding.

The examples according to this preferred embodiment had almost the same impact strength as a reclaimed material of elastomer modified plastics including no paint film.

[The fourth Preferred Embodiment]

<with alcohol, no catalyst, not more than a melting point of plastics>

(No. 21)

400 liters of isopropyl alcohol were introduced into a vessel having the capacity of 2100 liters and an agitator. Then 100 kg of a pulverized material were fed to the apparatus. The pulverized material was prepared by pulverizing waste elastomer modified polypropylene resin having a polyester-melamine paint film by a hammer mill or the like into about 5×5×5 mm cube. The vessel was heated to 80° C. while agitating the pulverized material. The vessel was held at 80° C. in this state for 120 minutes. Then, the pulverized material was taken out of the vessel.

The hydrolyzed pulverized material was melted and kneaded into pellets by using a NRII type 36 mm one direction high rotational vent twin spindle extruder produced by Nakatani Kikai Co., Ltd. A rectangle specimen of 63×12×6 mm in dimensions was molded by an injection molding machine. The test specimen was notched and subjected to an Izod impact test.

The Izod impact strength of the obtained reclaimed resin was 52 kgfcm/cm$^2$. The moldability of the reclaimed resin was equal to that of a new material. No part of the paint film was visually observed on the surface of the molding, and the molding had equal surface quality to that of-a new material molding.
(No. 22)

400 liters of isopropyl alcohol were introduced into an autoclave having the capacity of 2100 liters and an agitator. Then 100 kg of the pulverized waste elastomer modified polypropylene resin having the polyester-melamine paint film of Example No. 21 were fed to the apparatus. After sealing the autoclave, the pulverized waste material was heated from room temperature to 130° C. in an isopropyl alcohol bath in about two minutes while being agitated, and the pressure of 5 kg/cm$^2$ was applied. The autoclave was held at 130° C. under the pressure for sixty minutes. Then the pressure on the autoclave was released to the atmospheric pressure in about two minutes, and the pulverized material was taken out of the apparatus.

A specimen for an impact test was produced from the hydrolyzed pulverized material in the same way as Example No. 21.

The Izod impact strength of the obtained reclaimed resin was 54 kgfcm/cm$^2$. The moldability of the reclaimed resin was equal to that of a new material. No part of the paint film was visually observed on the surface of the molding, and the molding had equal surface quality to that of a new material molding.

[The Fifth Preferred Embodiments]
<with alcohol and catalysts, not more than a melting point of plastics>
(No. 23)

400 liters of an isopropyl: alcohol solution including 5 concentration % of hydrochloric acid were introduced into an apparatus having the capacity of 2100 liters and an agitator. Then 100 kg of pulverized waste elastomer modified polypropylene resin having a polyester-melamine paint film were fed to the apparatus, and heated to 80° C. while being agitated. The apparatus was held at 80° C. in this state for 120 minutes. Then the pulverized material was taken out of the apparatus.

The pulverized material after the hydrolysis treatment was washed with water and then made into a test specimen in the same way as Example No. 21. The Izod impact strength of the obtained reclaimed resin was 56kgfcm/cm$^2$. The moldability of the reclaimed resin was equal to that of a new material. No part of the paint film was visually observed on the surface of the molding, and the molding had equal surface quality to that of a new material molding.
(No. 24)

Pulverized elastomer modified polypropylene resin having a polyester-melamine paint film was immersed in a solution in which 35% hydrochloric acid was dissolved in 99.5% ethyl alcohol in an amount of 5% by weight at room temperature for six hours to hydrolyze the paint film. After removing the solvent, the hydrolyzed resin was dried by a vacuum dryer, thereby producing a reclaimed resin composition. In this state, a part of the hydrolyzed paint film was adhered to the surface of the plastics. The hydrolyzed resin was made into pellets by an extruder, and the pellets were molded into a rectangle test specimen of 63×12×6 mm in dimensions by an injection molding machine. The test specimen was notched and subjected to an Izod impact test. The Izod impact strength of the obtained reclaimed resin was 54 kgfcm/cm$^2$.
(No. 25)

Pulverized waste elastomer modified polypropylene resin having a polyester-melamine paint film was immersed in an ethyl alcohol solution including hydrochloric acid by 0.1% at 80° C. for two hours, to hydrolyze the paint film. After removing the solvent, the hydrolyzed resin was dried by a vacuum dryer. In this state, a part of the hydrolyzed paint film was adhered to the surface of the pulverized plastics. The hydrolyzed resin was made into pellets by an extruder, thereby producing a reclaimed resin composition. A rectangle test specimen of 63×12×6 mm in dimensions was molded from the pellets by an extruder. The test specimen was notched and subjected to an Izod impact test. The impact strength was 56 kgfcm/cm$^2$.

Besides, a material in which the reclaimed resin was mixed with a new elastomer modified polypropylene material by 50% by weight had the impact strength of 58 kgfcm/cm$^2$. That strength was on the same level as 58 kgfcm/cm$^2$ exhibited by a molding made from a 100% new material.
(No. 26)

Pulverized elastomer modified polypropylene resin having a polyester-melamine paint film was immersed in a solution in which sodium hydroxide was dissolved in 100% isopropyl alcohol by 5% by weight at 80° C. for two hours, to hydrolyze the paint film. After removing the solvent, the hydrolyzed resin was dried by a vacuum dryer. In this state, a part of the hydrolyzed paint film was adhered to the surface of the plastics. The hydrolyzed resin was made into pellets by an extruder, thereby producing a reclaimed resin composition. The pellets were made into a rectangle test specimen of 63×12×6 mm by an injection molding machine. The test specimen was notched and subjected to an Izod impact test. The impact strength was 56 kgfcm/cm$^2$.

A molding made from a material in which the reclaimed resin was mixed with a new elastomer modified polypropylene material by 50% by weight had the impact strength of 58 kgfcm/cm$^2$. This was on the same level as the impact strength of 58 kgfcm/cm$^2$ exhibited by a molding made from a 100% new material.
(No. 27)

400 liters of an isopropyl alcohol solution including 5 concentration % of hydrochloric acid were introduced into an autoclave having the capacity of 2100 liters and an agitator. Then 100 kg of pulverized waste elastomer modified polypropylene resin having a polyester-melamine paint film were fed to the autoclave. After sealing the autoclave, the pulverized waste material was heated from room temperature to 130° C. in about two minutes while being agitated in the hydrochloric acid added isopropyl alcohol bath, and the pressure of 5 kg/cm$^2$ was applied. The autoclave was held at 130° C. under the pressure for sixty minutes. Then the pressure on the autoclave was released to the atmospheric pressure in about two minutes, and the pulverized material was taken out of the autoclave.

The pulverized resin after the hydrolysis treatment was washed with water. Then a test specimen was produced from the resin and subjected to an impact test in the same way as Example No. 21.

The Izod impact strength of the obtained reclaimed resin was 56 kgfcm/cm². The moldability of the reclaimed resin was equal to that of a new material. No part of the paint film was visually observed on the surface of the molding, and the molding had equal surface quality to that of a new material molding.

The results are shown in Table 2. The impact strength of the examples of this preferred Embodiment was almost on the same level as that of Comparative Example No. R2 which was reclaimed from the elastomer modified plastics having no paint film.

[The Sixth Preferred Embodiment]
<With water and alcohol, no catalyst, not more than a melting point of plastics>
(No. 28)

100 liters of a solution in which isopropyl alcohol and water are mixed at the weight ratio of 1 to 1 were introduced into a vessel having the capacity of 2100 liters and an agitator. Then, 100 kg of pulverized waste elastomer modified polypropylene resin having a polyester-melamine paint film were fed to the vessel. The pulverized material was heated to 80° C. while being agitated, and held in this state at 80° C. for sixty minutes. Then, the pulverized material was taken out of the vessel.

The pulverized resin after the hydrolysis treatment was made into pellets in the same way as Example No. 21. Then, a rectangle test specimen of 63×12×6 mm in dimensions was molded from the pellets by an injection molding machine. The test specimen was notched and subjected to an Izod impact test.

The Izod impact strength of the obtained reclaimed resin was 55 kgfcm/cm².

The moldability of the reclaimed resin was equal to that of a new material. No part of the paint film was visually observed on the surface of the molding, and the molding had equal surface quality to that of a new material molding.
(No. 29)

400 liters of a solution in which isopropyl alcohol and water were mixed at the weight ratio of 1 to 1 were introduced into an autoclave having the capacity of 2100 liters and an agitator. Then, 100 kg of pulverized waste elastomer modified polypropylene resin having a polyester-melamine paint film were fed to the autoclave. After sealing the autoclave, the pulverized waste material was heated from room temperature to 130° C. in about two minutes, while being agitated in the mixed solution of water and isopropyl alcohol, and the pressure of 4 kg/cm² was applied. The autoclave was held in this state at 130° C. for thirty minutes. Then the pressure on the autoclave was released to the atmospheric pressure in about two minutes, and the pulverized material was taken out of the autoclave.

The pulverized resin after the hydrolysis treatment was made into a test specimen in the same way as Example No. 21 and subjected to an impact test. The Izod impact strength of the obtained reclaimed resin was 56 kgfcm/cm².

The moldability of the reclaimed resin was equal to that of a new material. No part of the paint film was visually observed on the surface of the molding, and the molding had equal surface quality to that of a new material molding.
(No. 30)

400 liters of a solution in which isopropyl alcohol and water were mixed in equal amounts were introduced into an autoclave and heated to 80° C. Then, 100 kg of pulverized waste elastomer modified polypropylene resin having an urethane paint film were fed to the autoclave. After sealing the autoclave, the pulverized waste material was heated from 80° C. to 130° C. while being agitated in the mixed solution of water and isopropyl alcohol, and the pressure of 4 kg/cm² was applied on the autoclave. The autoclave was held at 130° C. under the pressure for thirty minutes. Then the pulverized waste material was gradually cooled and opened to the atmospheric air. Then the pulverized material was taken out of the autoclave.

The pulverized resin after the hydrolysis treatment was made into a test specimen in the same way as the First Preferred Embodiment and subjected to an impact test. The Izod impact strength of the obtained reclaimed resin was 56 kgfcm/cm².

The moldability of the reclaimed resin was equal to that of a new material. No part of the paint film was visually observed on the surface of the molding, and the molding had equal surface quality to that of a new material molding.

[The Seventh Preferred Embodiment]
<With water and alcohol, and with catalysts, not more than a melting point of plastics>
(No. 31)

400 liters of a solution in which activated clay was added by 4% to a mixed solution of isopropyl alcohol and water at the weight ratio of 1 to 1 were introduced into a vessel having the capacity of 2100 liters and an agitator. Then 100 kg of pulverized waste elastomer modified polypropylene resin having a polyester-melamine paint film were fed to the vessel. The pulverized material was heated to 80° C. while being agitated, and held in this state at 80° C. for sixty minutes. Then the pulverized material was taken out of the vessel.

The pulverized resin after the hydrolysis treatment was washed with water and made into a test specimen in the same way as Example No. 21.

The Izod impact strength of the obtained reclaimed resin was 56 kgfcm/cm².

The moldability of the reclaimed resin was equal to that of a new material. No part of the paint film was visually observed on the surface of the molding, and the molding had equal surface quality to that of a new material molding.
(No. 32)

400 liters of an isopropyl alcohol aqueous solution including 1N-hydrochloric acid were introduced into a vessel having the capacity of 2100 liters and an agitator. Then 100 kg of pulverized waste elastomer modified polypropylene resin having a polyester-melamine paint film were fed to the vessel. The pulverized material was subjected to immersion treatment at 85° C. for thirty minutes while being agitated. After removing the solvent, the pulverized material was dried by a vacuum drier. In this state, the hydrolyzed paint film was not completely dissolved in isopropyl alcohol, and a part of the paint film was adhered to the surface of the plastics. The hydrolyzed resin was made into pellets by an extruder, and a test specimen for examining the impact strength was produced by injection molding the pellets.

The Izod impact strength of the obtained reclaimed resin was 55 kgfcm/cm².
(No. 33)

400 liters of a solution in which sodium methoxide was added by 5% to a mixed solution of isopropyl alcohol and water at the weight ratio of 1 to 1 were introduced into an autoclave having the capacity of 2100 liters and an agitator. Then 100 kg of pulverized elastomer modified polypropylene resin having a polyester-melamine paint film were fed to the autoclave. After sealing the autoclave, the pulverized waste material was heated from room temperature to 130° C. in about two minutes, while being agitated in the bath, and the pressure of 4 kg/cm² was applied on the autoclave. The pulverized material was held at 130° C. under the pressure for thirty minutes. Then, the pressure on the autoclave was released to the atmospheric pressure in about two minutes, and the pulverized material was taken out of the autoclave.

The pulverized resin after the hydrolysis treatment was washed with water, and a test specimen was produced in the same way as Example No. 21.

The Izod impact strength of the obtained reclaimed resin was 56 kgfcm/cm$^2$.

The moldability of the reclaimed resin was equal to that of a new material. No part of the paint film was visually observed on the surface of the molding, and the molding had equal surface quality to that of a new material molding.
(No. 34)

400 liters of a solution in which hydrochloric acid was added by 1% by weight to a mixed solution of ethyl cellosolve and water at the weight ratio of 1 to 1 were introduced into an autoclave having the capacity of 2100 liters and an agitator. Then the solution was heated to 80° C. and then 100 kg of pulverized elastomer modified polypropylene resin having a polyester-melamine paint film were fed to the autoclave. After sealing the autoclave, the pulverized material was heated from 80° C. to 110° C. while being agitated in the bath, and the pressure of 1.5 atm was applied. The pulverized material was held at 110° C. under the pressure for thirty minutes, and then cooled gradually. After that, the pressure was released to the atmospheric pressure, and the pulverized material was taken out of the autoclave.

The pulverized material after the hydrolysis treatment was washed with water and made into a test specimen in the same way as Example No. 21 and subjected to an impact test.

The Izod impact strength of the obtained reclaimed resin was 56 kgfcm/cm$^2$.

The moldability of the reclaimed resin was equal to that of a new material. No part of the paint film was visually observed on the surface of the molding, and the molding had equal surface quality to that of a new material molding.

The results are shown in Table 2. All of the examples according to this preferred embodiment showed impact strength on the same level as Comparative Example No. R2 which was reclaimed from the plastics having no paint film.
[The Eighth Preferred Embodiment]
<With immersion treatment, at least a melting point of plastics>
(No. 35)

12 liters of water were introduced into an autoclave having the capacity of 20 liters, and 5 kg of pulverized waste elastomer modified polypropylene resin having a polyester-melamine paint film were fed to the autoclave. After sealing the autoclave, the pulverized material was heated to 240° C. and the pressure of 35 kg/cm$^2$ was applied. The pulverized material was held at 240° C. under the pressure for twenty minutes. Then the pressure on the autoclave was released to the atmospheric pressure, and the pulverized material was taken out of the autoclave.

The pulverized material had a porous structure in which resin particles were fused together, and had such a high temperature as to be dried by being left as it was after taken out of the autoclave. After dried, the pulverized material was melted and kneaded into pellets by using a NRII type 36 mm one direction high speed rotational vent twin spindle extruder produced by Nakatani Kikai Co., Ltd. A rectangle test specimen of 63×12×6 mm in dimensions was produced from the pellets by an injection molding machine. The test specimen was notched and subjected to an Izod impact test.

The Izod impact strength of the obtained reclaimed resin was 56 kgfcm/cm$^2$.

The moldability of the reclaimed resin was equal to that of a new material. No part of the paint film was visually observed on the surface of the molding, and the molding had equal surface quality to that of a new material molding.
(No. 36)

12 liters of water including activated clay by 4% were introduced into an autoclave having the capacity of 20 liters. Then 5 kg of pulverized waste elastomer modified polypropylene resin having a polyester-melamine paint film were fed to the autoclave. After sealing the autoclave, the pulverized material was heated to 240° C. and the pressure of 35 kg/cm$^2$ was applied. The pulverized material was held at 240° C. under the pressure for five minutes. Then the pressure on the autoclave was released to the atmospheric pressure, and the pulverized material was taken out of the autoclave.

The pulverized resin had a high temperature and a porous structure in which resin particles were fused together in the same way as Example No. 35. The pulverized resin was washed with water and dried by being left as it was. A test specimen was produced from the pulverized resin in the same way as Example No. 35.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.
(No. 37)

12 liters of isopropyl alcohol were introduced into an autoclave having the capacity of 20 liters. Then 5 kg of pulverized waste elastomer modified polypropylene resin having a polyester-melamine paint film was fed to the apparatus. After sealing the autoclave, the pulverized material was heated to 200° C. and the pressure of 30 kg/cm$^2$ was applied. The pulverized material was held at 200° C. under the pressure for twenty minutes. Then, the pressure on the autoclave was released to the atmospheric air and the pulverized material was taken out of the autoclave.

The pulverized material had a porous structure in which resin particles were melted together in the same way as Example No. 35, and had such a high temperature as to be dried by left as it was after taken out of the autoclave. A test specimen was produced in the same way as Example No. 35.

The Izod impact strength of the obtained reclaimed resin was 56 kgfcm/cm$^2$.

The moldability of the reclaimed resin was equal to that of a new material. No part of the paint film was visually observed on the surface of the molding, and the molding had equal surface quality to that of a new material molding.
(No. 38)

12 liters of water including activated clay by 4% were introduced into an autoclave having the capacity of 20 liters. Then 5 kg of pulverized waste elastomer modified polypropylene resin having a polyester-melamine paint film were fed to the autoclave. After sealing the autoclave, the pulverized material was heated to 200° C. and the pressure of 30 kg/cm$^2$ was applied. The pulverized material was held at 200° C. under the pressure for five minutes. Then the pressure on the autoclave was released to the atmospheric pressure, and the pulverized material was taken out of the autoclave.

The pulverized resin had a high temperature and a porous structure in which resin particles were fused together in the same way as Example No. 35. The pulverized resin was washed with water and dried by being left as it was. A test specimen was produced in the same way as Example No. 35 and subjected to an impact test.

The Izod impact strength of the obtained reclaimed resin was 56 kgfcm/cm².

The moldability of the reclaimed resin was equal to that of a new material. No part of the paint film was visually observed on the surface of the molding, and the molding had equal surface quality to that of a new material molding.
(No. 39)

12 liters of a mixed solution of isopropyl alcohol and water at the weight ratio of 1 to 1 were introduced into an autoclave having the capacity of 20 liters. Then 5 kg of pulverized waste elastomer modified polypropylene resin having a polyester-melamine paint film was fed to the apparatus. After sealing the autoclave, the pulverized material was heated to 200° C. and the pressure of 23 kg/cm² was applied. The pulverized material was held at 200° C. under the pressure for twenty minutes. Then, the pressure on the autoclave was released to the atmospheric pressure and the pulverized material was taken out of the autoclave.

The pulverized resin had a porous structure in which resin particles were fused together in the same way as Example No. 35, and had such a high temperature as to be dried by being left as it was after taken out of the autoclave. A test specimen was produced in the same way as Example No. 35.

The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 40)

12 liters of a mixed solution of isopropyl alcohol and water at the weight ratio of 1 to 1 were introduced into an autoclave having the capacity of 20 liters. Then 5 kg of pulverized elastomer modified polypropylene resin having a polyester-melamine paint film were fed to the autoclave. After sealing the autoclave, the pulverized material was heated to 200° C. and the pressure of 23 kg/cm² was applied. The pulverized material was held at 200° C. under the pressure for twenty minutes. Then the pressure on the autoclave was released to the atmospheric pressure, and the pulverized material was taken out of the autoclave.

The pulverized resin had a porous structure in which resin particles were melted together in the same way as Example No. 35, and had such a high temperature as to be dried by being left as it was after taken out of the autoclave. A test specimen was produced in the same way as Example No. 35.

The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.

The examples of this preferred embodiment showed impact strength on the same level as that of Comparative Example No. R2 which was reclaimed from the plastics having no paint film. The results are shown in Table 3.

[The Ninth Preferred Embodiment]
<with water vapor, not more than a melting point of plastics>

Waste elastomer modified polypropylene resin having a polyester-melamine paint film was pulverized into about 5×5×5 mm cube. The pulverized material was hydrolyzed on the following conditions.
(No. 41 and No. 42)

The pulverized material of Example No. 41 and No. 42 was subjected to 100% relative humidity water vapor treatment at 130° C. under the pressure of 2.8 kgf/cm² by using an autoclave (PC-211 produced by Tabaiesupekku Co., Ltd.) for one hour in the case of Example No. 41 and for four hours in the case of Example No. 42. Then the hydrolyzed pulverized resin was dried by a vacuum dryer, thereby producing a reclaimed resin composition for molding. In this state, the hydrolyzed paint film was adhered to the surface of the plastics. After dried, a rectangle test specimen of 63×12×6 mm in dimensions was produced from each hydrolyzed resin by an injection molding machine. The test specimens were notched and subjected to an Izod impact test.
(No. 43 and No. 44)

Waste elastomer modified polypropylene having an acryl-melamine paint film was pulverized in the same way as above. The pulverized resin of Example No. 43 and No. 44 were subjected to 100% relative humidity water vapor treatment at 130° C. under the pressure of 2.8 kgf/cm² for one hour in the case of Example No. 43 and for four hours in the case of Example No. 44. The hydrolyzed pulverized resins were immersed in thinner and subjected to ultrasonic cleaning for ten minutes. Thus, the hydrolyzed paint films were dissolved in thinner and dried after removing thinner.

A rectangle test specimen of 63×12×6 mm in dimensions was produced from each dried resin by an injection molding machine. The test specimens were notched and subjected to an Izod impact test.
(No. 45)

Waste elastomer modified polypropylene having an urethane paint film was pulverized in the same way as above. The pulverized resin of Example No. 45 was hydrolyzed by being subjected to 100% relative humidity water vapor treatment at 130° C. for one hour. The pulverized resin after the hydrolysis treatment was melted at 230° C. and kneaded at 350 rpm, and extruded and solidified into pellets of about 3 mm in diameter by a twin spindle extruder produced by Nakatani Kikai Co., Ltd. Thus, a reclaimed resin composition for molding was produced.

A specimen for an Izod impact test was produced by injection molding the pellets on the same condition as Example No. 41.

Example No. 41 had the impact strength of 56 kgfcm/cm², Example No. 42 had the impact strength of 56 kgfcm/cm², Example No. 43 had the impact strength of 56 kgfcm/cm², Example No. 44 had the impact strength of 56 kgfcm/cm², and Example No. 45 had the impact strength of 56 kgfcm/cm².

Figure 2:
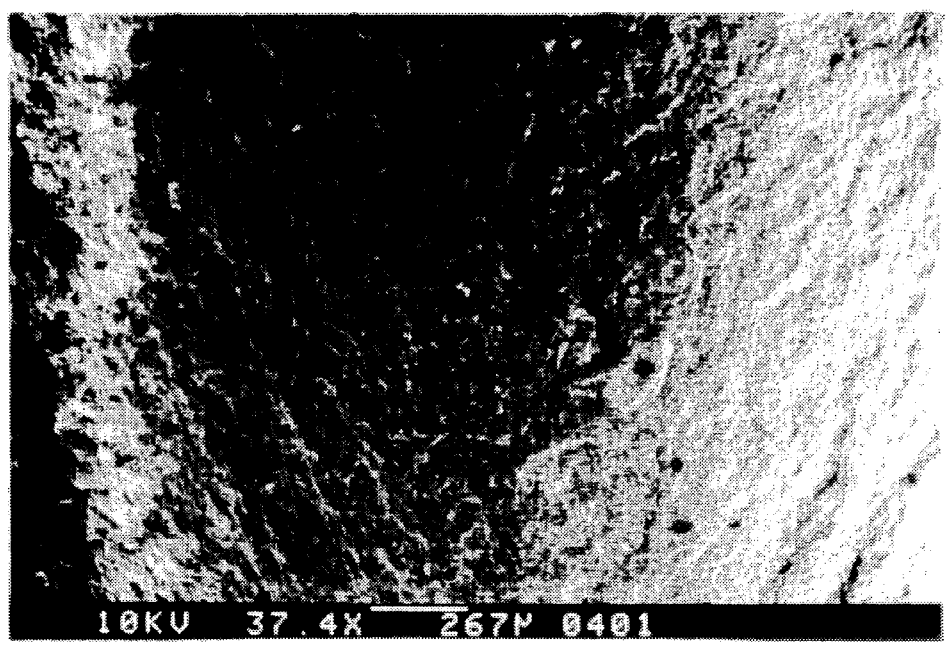
[FIG. 2] This drawing is a microphotograph of a particle structure of a broken-out section of a molding of Example No.43 which was molded after hydrolysis treatment and then subjected to an impact test.

Microscopic photographs of cross sections of Example Nos. 42 and 43 after the impact test are respectively shown in FIGS. 1 and 2. The resin layers of the both examples were uniform, and did not include the paint films as foreign matters.
(No. 46)

16.5 liters (7 kg) of pulverized waste elastomer modified polypropylene resin having a polyester-melamine paint film were introduced into a rotational cylindrical autoclave having the capacity of 22 liters and an agitating plate, and the autoclave was sealed. The autoclave was supplied with water vapor while being agitated, and heated from room temperature to 180° C. in about three minutes, and the pressure of 11 kg/cm² was applied. The pulverized material was held at 180° C. under the pressure for ten minutes. Then, the pressure on the autoclave was released to the atmospheric pressure in about four minutes, and the pulverized material was taken out of the autoclave.

The pulverized resin after the hydrolysis treatment was melted and kneaded into pellets by using a NRII type 36 mm one direction high speed rotational vent twin spindle extruder produced by Nakatani Kikai Co., Ltd. A rectangle test specimen of 63×12×6 mm in dimensions was molded by an injection molding machine. The test specimen was notched and subjected to an Izod impact test.

The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 47)

16.5 liters (7 kg) of pulverized waste elastomer modified polypropylene resin having as polyester-melamine paint film were introduced into an autoclave, and the autoclave was sealed. While being rotated, the autoclave was supplied with water vapor and heated from room temperature to 150° C. in about two minutes, and the pressure of 5 kg/cm² was applied. The pulverized material was held at 150° C. under the pressure for sixty minutes. Then the pressure on the autoclave was released to the atmospheric pressure in about four minutes, and the pulverized material was taken out of the autoclave.

A test specimen was produced from the hydrolyzed pulverized resin in the same way as Example No. 46, and subjected to an impact test. The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 48)

16.5 liters (7kg) of pulverized waste elastomer modified polypropylene resin having a polyester-melamine paint film were fed to an autoclave, and the autoclave was sealed. While being rotated, the autoclave was supplied with water vapor and heated from room temperature to 110° C. in about two minutes, and the pressure of 1.5 kg/cm² was applied. The pulverized material was held at 110° C. under the pressure for sixty minutes. Then the pressure on the autoclave was released to the atmospheric pressure in about three minutes, and the pulverized material was taken out of the autoclave.

A test specimen was produced from the hydrolyzed pulverized resin in the same way as Example No. 46 and subjected to an impact test. The Izod impact strength of the obtained reclaimed resin was 54 kgfcm/cm².

The moldability of the reclaimed resin was equal to that of a new material. No part of the paint film was visually observed on the surface of the molding, and the molding had equal surface quality to that of a new material molding.
(No. 49)

16.5 liters (7kg) of pulverized waste elastomer modified polypropylene resin having a polyester-melamine paint film were fed to an autoclave, and the autoclave was sealed. While the autoclave was rotated, water vapor was introduced and hydrochloric acid was dropped so that the percentage of hydrochloric acid in contact with the pulverized material was about 1%. The autoclave was heated from room temperature to 150° C. in about two minutes, and the pressure of 5 kg/cm² was applied. The pulverized material was held at 150° C. under the pressure for thirty minutes. Then the pressure on the autoclave was released to the atmospheric pressure in about three minutes, and the pulverized material was taken out of the autoclave.

The pulverized resin after the hydrolysis treatment was washed with water, and a test specimen was produced from the pulverized resin in the same way as Example No. 46 and subjected to an impact test. The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.

The examples of this preferred embodiment showed the impact strength on the same level as that of Comparative Example No. R2 which was reclaimed from the plastics having no paint film.

[The Tenth Preferred Embodiment]
<vapor treatment, not more than a melting point of plastics>
(No. 50 )

7 kg (16.5 liters) of pulverized waste elastomer modified polypropylene resin having a polyester-melamine paint film were fed to a rotational cylindrical autoclave having the capacity of 22 liters and an agitating plate, and the autoclave was sealed. While being rotated, the autoclave was supplied with isopropyl alcohol vapor and heated from room temperature to 130° C. in about two minutes and the pressure of 5 kg/cm² was applied. The pulverized material was held at 130° C. under the pressure for sixty minutes. Then the pressure on the autoclave was released to the atmospheric pressure in about three minutes, and the pulverized material was taken out of the autoclave.

The pulverized material after the hydrolysis treatment was melted, kneaded and pelletized by using a NRII type 36 mm one direction high speed rotational vent twin spindle extruder produced by Nakatani Kikai Co., Ltd. A rectangle test specimen of 63×12×6 mm in dimensions was molded from the pellets by an injection molding machine. The test specimen was notched and subjected to an Izod impact test.

The Izod impact strength of the obtained reclaimed resin was 57 kgfcm/cm².

The moldability of the reclaimed resin was equal to that of a new material. No part of the paint film was observed on the surface of the molding, and the molding had equal surface quality to that of a new material molding.
(No. 51)

7 kg (16.5 liters) of pulverized waste elastomer modified polypropylene resin having a polyester-melamine paint film were fed to an autoclave and the autoclave was sealed. While the autoclave was rotated, isopropyl alcohol vapor was introduced and hydrochloric acid was dropped so that the percentage of hydrochloric acid in contact with the pulverized material was about 1%, and the pulverized material was heated from room temperature to 130° C. in about two minutes and the pressure of 5 kg/cm² was applied. The pulverized material was held at 130° C. under the pressure for thirty minutes. Then the pressure on the autoclave was released to the atmospheric pressure in about three minutes, and the pulverized material was taken out of the autoclave.

The pulverized resin after the hydrolysis treatment was washed with water. Then a test specimen was produced from the pulverized resin in the same way as Example No. 50 and subjected to an impact test.

The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 52)

16.5 liters (7kg) of pulverized waste elastomer modified polypropylene resin having a polyester-melamine paint film were fed to the autoclave and the autoclave was sealed. While the autoclave was rotated, water vapor was introduced and isopropyl alcohol was dropped so that the weight ratio of isopropyl alcohol to water was approximately 1 to 1. The pulverized material was heated from room temperature to 130° C. in about two minutes, and the pressure of 4 kg/cm² was applied. The pulverized material was held at 130° C. under the pressure for thirty minutes, and the pressure on the autoclave was released to the atmospheric pressure in about two minutes, and the pulverized material was taken out of the autoclave.

The pulverized material after the hydrolysis treatment was made into a test specimen in the same way as Example No. 50 and subjected to an impact test. The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 53)

16.5 liters (7 kg) of pulverized waste elastomer modified polypropylene resin having a polyester-melamine paint film were fed to an autoclave and the autoclave was sealed. While the autoclave was rotated, water vapor was introduced and ethyl cellosolve was dropped so that the weight ratio of ethyl cellosolve to water was approximately 1 to 1 and hydrochloric acid was dropped so that the percentage of hydrochloric acid was about 1%. The pulverized material was heated from room temperature to 110° C. in about two minutes, and the pressure of 2 kg/cm² was applied. The pulverized material was held at 110° C. under the pressure for thirty minutes. Then the pressure on the autoclave was released to the atmospheric pressure in about one minute and the pulverized material was taken out of the autoclave.

The pulverized resin after the hydrolysis treatment was washed with water. Then a test specimen was produced from the resin in the same way as Example No. 50 and subjected to an impact test.

The Izod impact strength of the obtained reclaimed resin was 56 kgfcm/cm².

The moldability of the reclaimed resin was equal to that of a new material. No part of the paint film was visually observed on the surface of the molding, and the molding had equal surface quality to that of a new material molding.

The results are shown in Table 3.
[The Eleventh Preferred Embodiment]
<vapor treatment, at least a melting point of plastics>
(No. 54)

7 kg of pulverized waste elastomer modified polypropylene having a polyester-melamine paint film were fed to an autoclave having the capacity of 20 liters, and the autoclave was sealed. Water vapor was introduced into the autoclave and the pulverized material was heated to 240° C. and the pressure of 35 kg/cm² was applied on the autoclave. The pulverized material was held at 240° C. under the pressure for twenty minutes. Then the pressure on the autoclave was released to the atmospheric pressure, and the pulverized material was taken out of the autoclave.

The pulverized resin after the hydrolysis treatment had a porous structure in which resin particles were fused together, and such a high temperature as to be dried by being left as it was after taken out of the autoclave.

Next, the pulverized material was melted, kneaded and pelletized by using a NRII type 36 mm one direction high rotational vent twin spindle extruder produced by Nakatani Kikai Co., Ltd. Then the pellets was molded into a rectangle test specimen of 63×12×6 mm in dimensions by an injection molding machine. The test specimen was notched and subjected to an Izod impact test. The Izod impact strength of the obtained reclaimed resin was 56 kgfcm/cm².

The moldability of the reclaimed resin was equal to that of a new material. No part of the paint film was visually observed on the surface of the molding, and the molding had equal surface quality to that of a new material molding.
(No. 55)

7 kg of waste polypropylene resin having a polyester-melamine paint film which had been pulverized into 5×5×5 mm cube were fed to an autoclave having the capacity of 20 liters, and the autoclave was sealed. Water vapor was introduced into the autoclave while hydrochloric acid was dropped so that the percentage of hydrochloric acid in contact with the pulverized material was about 1%, and the pulverized material was heated to 240° C. and the pressure of 35 kg/cm² was applied on the autoclave. The pulverized material was held at 240° C. under the pressure for five minutes. Then the pressure on the autoclave was released to the atmospheric pressure and the pulverized material was taken out of the autoclave.

The pulverized resin after the hydrolysis treatment had a high temperature and a porous structure in which resin particles were fused together. After washed with water, the pulverized resin was dried by being left as it was. A rectangle test specimen of 63×12×6 mm in dimensions was produced from the hydrolyzed resin by an injection molding machine. The test specimen was notched and subjected to an Izod impact test.

The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 56 )

7 kg of waste elastomer modified polypropylene resin having a polyester-melamine paint film which had been pulverized into 5×5×5 mm cube were fed to an autoclave having the capacity of 20 liters and the autoclave was sealed, Isopropyl alcohol vapor was introduced and the pulverized material was heated to 200° C. and the pressure of 30 kg/cm² was applied, The pulverized material was held at 200° C. under the pressure for twenty minutes, Then the pressure on the autoclave was released to the atmospheric pressure and the pulverized material was taken out of the autoclave.

The pulverized material after the hydrolysis treatment had a porous structure in which resin particles were fused together and such a high temperature as to be dried by being left as it was after taken out of the autoclave. The hydrolyzed resin was molded into a rectangle test specimen of 63×12×6 mm in dimensions by an injection molding machine. The test specimen was notched and subjected to an Izod impact test.

The Izod impact strength of the obtained reclaimed resin was 57 kgfcm/cm².

The moldability of the reclaimed resin was equal to that of a new material. No part of the paint film was visually observed on the surface of the molding, and the molding had equal surface quality to that of a new material molding.
(No. 57)

7 kg of-waste elastomer modified polypropylene resin having a polyester-melamine paint film which had been pulverized into 5×5×5 mm cube were fed to an autoclave having the capacity of 20 liters and the autoclave was sealed. Isopropyl alcohol vapor was introduced while hydrochloric acid was dropped so that the percentage of hydrochloric acid in contact with the pulverized material in the autoclave was about 1%, and the pulverized material was heated to 200° C. and the pressure of 30 kg/cm² was applied on the autoclave. The pulverized material was held at 200° C. under the pressure for five minutes. Then the pressure on the autoclave was released to the atmospheric pressure and the pulverized material was taken out of the autoclave.

The pulverized resin after the hydrolysis treatment had a high temperature and a porous structure in which resin particles were fused together. After being washed with water to remove the acid, the pulverized material was dried by being left as it was. The hydrolyzed resin was molded into a rectangle test specimen of 63×12×6 mm in dimensions by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.
(No. 58)

7 kg of waste elastomer modified polypropylene resin having a polyester-melamine paint film which had been pulverized into 5×5×5 mm cube were fed to an autoclave having the capacity of 20 liters, and the autoclave was sealed. Water vapor was introduced while isopropyl alcohol was dropped so that the weight ratio of isopropyl alcohol to water was about 1 to 1, and the pulverized material was heated to 200° C. and the pressure of 23 kg/cm$^2$ was applied on the autoclave. The pulverized material was held at 200° C. under the pressure for ten minutes. The pressure on the autoclave was released to the atmospheric pressure and the pulverized material was taken out of the autoclave.

The pulverized resin after the hydrolysis treatment had a porous structure in which resin particles were fused together, and such a high temperature as to be dried by being left as it was after taken out of the autoclave. The hydrolyzed resin was molded into a rectangle test specimen of 63×12×6 mm by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.
(No. 59)

7 kg of waste elastomer modified polypropylene resin having a polyester-melamine paint film which had been pulverized into 5×5×5 mm cube were fed to an autoclave having the capacity of 20 liters, and the autoclave was sealed. Water vapor was introduced, while isopropyl alcohol was dropped so that the weight ratio of isopropyl alcohol to water was about 1 to 1 and hydrochloric acid was dropped so that the percentage of hydrochloric acid was about 1%. The pulverized material was heated to 200° C. and the pressure of 23 kg/cm$^2$ was applied on the autoclave. The pulverized material was held at 200° C. under the pressure for five minutes. Then the pressure on the autoclave was released to the atmospheric pressure and the pulverized material was taken out of the autoclave.

The pulverized resin after the hydrolysis treatment had a high temperature and a porous structure in which resin particles were fused together. After being washed with water to remove the acid, the pulverized material was dried by being left as it was. The hydrolyzed resin was molded into a rectangle test specimen of 63×12×6 mm in dimensions by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.

A comparative test specimen which was produced by pulverizing plastics as it was without hydrolyzing the paint film to produce a reclaimed resin composition and molding the pulverized resin in the same way as the examples of this preferred embodiment had the Izod impact strength of 38 kgfcm/cm$^2$. Namely, the examples of this preferred embodiment had higher impact strength than that of this comparative example. The Izod impact strength of a reclaimed resin composition produced from the resin with no paint film was 56 kgfcm/cm$^2$.

Accordingly, the respective test specimens of this preferred embodiment showed the impact strength on the same level as that of the reclaimed resin with no paint film, and exhibited no decrease in strength.

[The Thirteenth Preferred Embodiment]
<A kneading machine, at least a melting point of plastics>
(No. 60)

Waste elastomer modified polypropylene resin having a polyester-melamine paint film was pulverized into about 5×5×5 mm cube. This pulverized material was introduced into an introducing part A of a high speed rotational screw extruder shown by a cross sectional diagram in FIG. 5 (screw rotational speed: 350 rpm) and heated to 220° C. so that the pulverized resin was completely melted in a part B. In a part C, water vapor at 240° C. under the pressure of 35 kg/cm$^2$ was introduced into a treating liquid inlet port, and the paint film was hydrolyzed and the resin was melted and kneaded by the rotation of the screw for ten minutes. In this case, the water vapor did not flow in the part B where the resin was completely melted, and the water vapor after the hydrolysis treatment was flown out from a vent provided at an end of the part C. In a part D, the pulverized material was kneaded and extruded into pellets of 3 mm in diameter and 5 mm in length.

The hydrolyzed resin was molded into a rectangle test specimen of 63×12×6 mm in dimensions by an injection molding machine. The test specimen was notched and subjected to an Izod impact test.

The Izod impact strength of the obtained reclaimed resin was 56 kgfcm/cm$^2$.

The moldability of the reclaimed resin was equal to that of a new material. No part of the paint film was visually observed on the surface of the molding, and the molding had equal surface quality to that of a new material molding.
(No. 61)

Waste elastomer modified polypropylene resin having a polyester-melamine paint film was pulverized into about 5×5×5 mm cube. The waste pulverized material was fed from the introducing part A of the high speed rotational screw extruder (screw rotational speed: 350 rpm), and heated to 220° C. and completely melted in the part B. In the part C, water vapor at 240° C. under the pressure of 35 kg/cm$^2$, including hydrochloric acid by 1% by weight, was introduced, and the paint film was hydrolyzed and the resin was melted and kneaded by the rotation of the screw for five minutes. In this case, the water vapor did not flow into the part B where the resin was completely melted, and the water vapor after hydrolyzing the paint film was flown from the vent provided at the end of the part C. Further in the part D, the pulverized material was kneaded and extruded into pellets of 3 mm in diameter and 5 mm in length.

The hydrolyzed resin was molded into a rectangle specimen of 63×12×6 mm in dimensions by an injection molding machine. The test specimen was notched and subjected to an Izod impact test.

The Izod impact strength of the obtained reclaimed resin was 56 kgfcm/cm$^2$.

The moldability of the reclaimed resin was equal to that of a new material. No part of the paint film was visually observed on the surface of the molding, and the molding had equal surface quality to that of a new material molding.
(No. 62)

Waste elastomer modified polypropylene resin having a polyester-melamine paint film was pulverized into about 5×5×5 mm cube. The waste pulverized material was introduced into the introducing part A of the high speed rotational screw extruder (screw rotational speed: 350 rpm), and heated to 220° C., and completely melted in the part B. In the part C, isopropyl alcohol vapor at 240° C. under the pressure of 30 kg/cm$^2$ was introduced into the treating liquid inlet port, and the paint film was hydrolyzed and the resin was melted and kneaded by the rotation of the screw for ten minutes. In this case, the vapor did not flow into the part B where the resin was completely melted, and the vapor after hydrolyzing the paint film was flown out from the vent provided at the end of the part C. Further in the part D, the pulverized material was kneaded and extruded into pellets of 3 mm in diameter and 5 mm in length.

A rectangle test specimen of 63×12×6 mm in dimensions was molded from the hydrolyzed resin by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.
(No. 63)

Waste elastomer modified polypropylene resin having a polyester-melamine paint film was pulverized into about 5×5×5 mm cube. The waste pulverized material was introduced into the introducing part A of the high speed rotational screw extruder (screw rotational speed: 350 rpm) and heated to 220° C. and completely melted in the part B. In the part C, isopropyl alcohol vapor at 200° C. under the pressure of 30 kg/cm$^2$ including hydrochloric acid by 1% by weight was introduced into the treating liquid inlet port, and the paint film was hydrolyzed and the resin was melted and kneaded by the rotation of the screw for five minutes. In this case, the vapor did not flow into the part B where the resin was completely melted, and the vapor after hydrolyzing the paint film was flown out from the vent provided at the end of the part C. Further in the part D, the pulverized material was kneaded and extruded into pellets of 3 mm in diameter and 5 mm in length.

A rectangle test specimen of 63×12×6 mm in dimensions was molded from the hydrolyzed resin by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.
(No. 64)

Waste elastomer modified polypropylene resin having a polyester-melamine paint film was pulverized into about 5×5×5 mm cube. The waste pulverized material was introduced into the vent of the high speed rotational screw extruder (temperature: 230° C., screw rotational speed: 350 rpm). While a solution in which 35% hydrochloric acid was dissolved in 100% isopropyl alcohol by 5% by weight was added, the pulverized material was melted and kneaded for five minutes and extruded and made into pellets of 3 mm in diameter and 5 mm in length by a pelletizer.

A rectangle test specimen of 63×12×6 mm in dimensions was molded from the hydrolyzed resin by an injection molding machine. The test specimen was notched and subjected to an Izod impact test.

A molding of a material in which the reclaimed resin was mixed with a new elastomer modified polypropylene material by 50% weight had the Izod impact strength of 57 kgfcm/cm$^2$. This was approximately on the same level as 58 kgfcm/cm$^2$ exhibited by a molding of a 100% new material.

The moldability of the reclaimed resin was equal to that of a new material. No part of the paint film was visually observed on the surface of the molding, and the molding had equal surface quality to that of a new material molding.
(No. 65)

Waste elastomer modified polypropylene resin having a polyester-melamine paint film was pulverized into about 5×5×5 mm cube. The pulverized material was introduced into the vent of the high speed rotational screw extruder (temperature: 230° C., screw rotational speed: 350 rpm). While a solution in which sodium hydroxide was dissolved in 100% ethyl alcohol by 5% by weight was added, the pulverized material was melted and kneaded for five minutes and extruded, and then made into pellets of 3 mm in diameter and 5 mm in length by a pelletizer. A rectangle specimen of 63×12×6 mm in dimensions was molded from the hydrolyzed resin by an injection molding machine. The test specimen was notched and subjected to an Izod impact test.

A molding of a material in which the reclaimed resin was mixed with a new elastomer modified polypropylene material by 50% by weight had the Izod impact strength of 57 kgfcm/cm$^2$. This was approximately on the same level as 58 kgfcm/cm$^2$ exhibited by a molding of a 100% new material.

The moldability of the reclaimed resin was equal to that of a new material. No part of the paint film was visually observed on the surface of the molding, and the molding had equal surface quality to that of a new material molding.
(No. 66)

Waste elastomer modified polypropylene resin having a polyester-melamine paint film was pulverized into about 5×5×5 mm cube. The pulverized waste material was fed into the introducing part A of the high speed rotational screw extruder (screw rotational speed: 350 rpm), and heated to 220° C. and completely melted in the part B. In the part C, vapor in which water and isopropyl alcohol were mixed at the weight ratio of 1 to 1 at 200° C. under the pressure of 23 kg/cm$^2$ was introduced into the treating liquid inlet port, and the paint film was hydrolyzed and the resin was melted and kneaded by the rotation of the screw for ten minutes. In this case, the vapor did not flow into the part B where the resin was completely melted, and the vapor after hydrolyzing the paint film was flown out from the vent at the end of the part C. Further in the part D, the pulverized material was kneaded and extruded into pellets of 3 mm in diameter and 5 mm in length.

A rectangle test specimen of 63×12×6 mm in dimensions was molded from the hydrolyzed resin by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.

(No. 67)

Waste elastomer modified polypropylene resin having a polyester-melamine paint film was pulverized into about 5×5×5 mm cube. The waste pulverized material was fed to the introducing part A of the high speed rotational screw extruder (screw rotational speed: 356 rpm) and heated to 220° C. and completely melted in the part B. In the part C, vapor in which water and isopropyl alcohol were mixed at the weight ratio of 1 to 1 and hydrochloric acid was added by 1% by weight at 200° C. under the pressure of 23 kg/cm$^2$ was introduced into the treating liquid inlet port, and the paint film was hydrolyzed and the resin was melted and kneaded by the rotation of the screw for five minutes. In this case, the vapor did not flow in the part B where the resin was completely melted, and the vapor after hydrolyzing the paint film was flown out from the vent provided at the end of the part C. Further in the part D, the pulverized material was kneaded and extruded into pellets of 3 mm in diameter and 5 mm in length.

A rectangle test specimen of 63×12×6 mm in dimensions was molded from the hydrolyzed resin by an injection molding machine. The test specimen was notched and subjected to an Izod impact test.

The Izod impact strength of the obtained reclaimed resin was 57 kgfcm/cm$^2$.

The moldability of the reclaimed resin was equal to that of a new material. No part of the paint film was visually observed on the surface of the molding, and the molding had equal surface quality to that of a new material molding.

The results of this preferred embodiment are shown in Table 4. In the resin compositions for molding, the hydrolyzed paint films were finely dispersed in the resins. Therefore, the impact strength of the examples of this preferred embodiment was higher than that of untreated resin and equal to that of the reclaimed resin without the paint film.

FIG. 1 to FIG. 5 shows microphotographs of the cross section of the structures of the impact test specimens produced by the process of reclaiming the plastics according to the present invention after the test. Shown in FIG. 5, the comparative specimen No. R1 which was not subjected to hydrolysis treatment included parts of the paint film of about 200 micrometers in size in the structure, and the boundaries of the paint film and the base resin were peeled. Therefore, in the untreated resin, the paint film as foreign matters decreased the impact strength of the plastics. On the other hand, as FIGS. 1 to 4 showed the treated resins, the existence of the paint films were not confirmed in the cross sections, and it is assumed that the paint films were made into low molecular compound is and finely dispersed in the polypropylene resin without removing the hydrolyzed paint film. No decrease in impact strength was observed. FIG. 1 shows waste elastomer modified polypropylene having a polyester-melamine paint film and hydrolyzed by water vapor for 240 minutes. FIG. 2 shows waste elastomer modified polypropylene having an acryl-melamine paint film and hydrolyzed by water vapor for 60 minutes. FIG. 3 shows waste elastomer modified polypropylene having a polyester-melamine paint film and hydrolyzed by water at 150° C. for sixty minutes and then rapidly cooled to 80° C. FIG. 4 shows the pulverized resin after the hydrolysis treatment shown in FIG. 3 and then gradually cooled. Each of the resins subjected to each hydrolysis treatment showed uniform structure and exhibited impact strength almost on the same level.

Possibility of Industrial Use

In the process for reclaiming waste plastics having a paint film according to the present invention, the paint film was made into low molecular weight compounds by hydrolysis treatment, and finely and uniformly dispersed in the base resin. Therefore, the reclaimed resin composition for molding had no decrease in impact strength, and equal mechanical properties to that of a resin which was reclaimed from plastics with no paint film. Accordingly, the reclaimed resin composition for molding can be reused in many fields by itself or by mixed with a new material.

TABLE 1

| Ex. No. Paint film | Treating liquid | Catalyst | Temperature (C.°) | Pressure (kgf/cm$^2$) | Hydrolysis time (minute) | Impact strength (kgfcm/cm$^2$) |
|---|---|---|---|---|---|---|
| 1 PM | Water | None | 100 | Ordinary pressure | 600 | 54 |
| 2 PM | Water | None | 180 | 11 | 10 | 56 |
| 3 PM | Water | None | 150 | 5 | 60 | 56 |
| 4 PM | Water | None | 150 | 5 | 60 | 57 |
| 5 PM | Water | None | 150 | 5 | 60 | 57 |
| 6 AM | Water | None | 150 | 5 | 60 | 56 |
| 7 AM | Water | None | 150 | 5 | 60 | 57 |
| 8 AM | Water | None | 130 | 3 | 60 | 55 |
| 9 U | Water | None | 150 | 5 | 60 | 56 |
| 10 U | Water | None | 150 | 5 | 60 | 57 |
| 11 U | Water | None | 130 | 3 | 60 | 57 |
| R1 PM | — | None | — | — | — | 38 |
| R2 — | — | None | — | — | — | 56 |
| R3 PM | — | None | — | — | — | 38 |
| 12 PM | Water | Acetic acid | Room temperature | Ordinary pressure | 360 | 55 |
| 13 PM | Water | Acetic acid | 80 | Ordinary pressure | 120 | 56 |
| 14 PM | Water | Hydrochloric acid | Room temperature | Ordinary pressure | 360 | 54 |
| 15 PM | Water | Hydrochloric acid | 80 | Ordinary pressure | 120 | 55 |
| 16 PM | Water | NaOH | 80 | Ordinary pressure | 120 | 56 |

Note:
PM means polyester melamine.
AM means acryl-melamine.
U means urethane.

TABLE 2

| Ex. No. Paint film | Treating liquid | Catalyst | Temperature (C.°) | Pressure (kgf/cm$^2$) | Hydrolysis time (minute) | Impact strength (kgfcm/cm$^2$) |
|---|---|---|---|---|---|---|
| 17 PM | Water | Hydrochloric acid | 150 | 5 | 30 | 57 |
| 18 PM | Water | Activated clay | 150 | 5 | 30 | 57 |
| 19 PM | Water | Zinc chloride | 150 | 5 | 30 | 54 |
| 20 PM | Water | MeONa | 130 | 3 | 60 | 56 |
| 21 PM | IPA | None | 80 | Ordinary pressure | 120 | 52 |
| 22 PM | IPA | None | 130 | 5 | 60 | 54 |
| 23 PM | IPA | Hydrochloric acid | 80 | Ordinary pressure | 120 | 56 |
| 24 PM | EA | Hydrochloric acid | Room temp. | Ordinary pressure | 360 | 54 |
| 25 PM | EA | Hydrochloric acid | 80 | Ordinary pressure | 120 | 56 |
| 26 PM | IPA | NaOH | 80 | Ordinary pressure | 120 | 56 |
| 27 PM | IPA | Hydrochloric acid | 130 | 5 | 60 | 56 |
| 28 PM | IPA-water | None | 80 | Ordinary pressure | 60 | 55 |
| 29 PM | IPA-water | None | 130 | 4 | 30 | 56 |
| 30 U | IPA-water | None | 130 | 4 | 30 | 56 |
| 31 PM | IPA-water | Activated clay | 80 | Ordinary pressure | 60 | 56 |
| 32 PM | IPA-water | Hydrochloric acid | 85 | Ordinary pressure | 30 | 55 |
| 33 PM | IPA-water | MeONa | 130 | 4 | 30 | 56 |
| 34 PM | ECe-water | Hydrochloric acid | 110 | 1.5 | 30 | 56 |

Note:
IPA means isopropyl alcohol.
EA means ethyl alcohol.
ECe means ethyl cellosolve.
MeONa means sodium methoxide.

TABLE 3

| Ex. No. Paint film | Treating liquid | Catalyst | Temperature (C.°) | Pressure (kgf/cm$^2$) | Hydrolysis time (minute) | Impact strength (kgfcm/cm$^2$) |
|---|---|---|---|---|---|---|
| 35 PM | Water | None | 240 | 35 | 20 | 56 |
| 36 PM | Water | Activated clay | 240 | 35 | 5 | 57 |
| 37 PM | IPA | None | 200 | 30 | 20 | 56 |
| 38 PM | IPA | Activated clay | 200 | 30 | 5 | 56 |
| 39 PM | IPA-water | None | 200 | 23 | 20 | 57 |
| 40 PM | IPA-water | Activated clay | 200 | 23 | 5 | 57 |
| 41 PM | Water vapor | None | 130 | 2.8 | 60 | 56 |
| 42 PM | Water vapor | None | 130 | 2.8 | 240 | 56 |
| 43 AM | Water vapor | None | 130 | 2.8 | 60 | 56 |
| 44 AM | Water vapor | None | 130 | 2.8 | 240 | 56 |
| 45 U | Water vapor | None | 130 | 2.8 | 60 | 56 |
| 46 PM | Water vapor | None | 180 | 11 | 10 | 57 |
| 47 PM | Water vapor | None | 150 | 5 | 60 | 57 |
| 48 PM | Water vapor | None | 110 | 1.5 | 60 | 54 |
| 49 PM | Water vapor | Hydrochloric acid | 150 | 5 | 30 | 57 |
| 50 PM | IPA | None | 130 | 5 | 60 | 57 |
| 51 PM | IPA | Hydrochloric acid | 130 | 5 | 30 | 57 |
| 52 PM | IPA-water | None | 130 | 4 | 30 | 57 |
| 53 PM | ECe-water | Hydrochloric acid | 110 | 2 | 30 | 56 |

TABLE 4

| Ex. No. Paint film | Treating liquid | Catalyst | Temperature (C.°) | Pressure (kgf/cm$^2$) | Hydrolysis time (minute) | Impact strength (kgfcm/cm$^2$) |
|---|---|---|---|---|---|---|
| 54 PM | Water vapor | None | 240 | 35 | 20 | 56 |
| 55 PM | Water vapor | Hydrochloric acid | 240 | 35 | 5 | 57 |
| 56 PM | IPA | None | 200 | 30 | 20 | 57 |
| 57 PM | IPA | Hydrochloric acid | 200 | 30 | 5 | 57 |
| 58 PM | IPA-water | None | 200 | 23 | 10 | 57 |
| 59 PM | IPA-water | Hydrochloric acid | 200 | 23 | 5 | 57 |
| 60 PM | Water vapor | None | 240 | 35 | 10 | 56 |
| 61 PM | Water vapor | Hydrochloric acid | 240 | 35 | 5 | 56 |
| 62 PM | IPA | None | 240 | 30 | 10 | 57 |

TABLE 4-continued

| Ex. No. Paint film | Treating liquid | Catalyst | Temperature (C.°) | Pressure (kgf/cm$^2$) | Hydrolysis time (minute) | Impact strength (kgfcm/cm$^2$) |
|---|---|---|---|---|---|---|
| 63 PM | IPA | Hydrochloric acid | 200 | 30 | 5 | 57 |
| 64 PM | IPA | Hydrochloric acid | 230 | 40 | 5 | 57 |
| 65 PM | EA | NaOH | 230 | 40 | 5 | 57 |
| 66 PM | IPA-water | None | 200 | 23 | 10 | 57 |
| 67 PM | IPA-water | Hydrochloric acid | 200 | 23 | 5 | 57 |

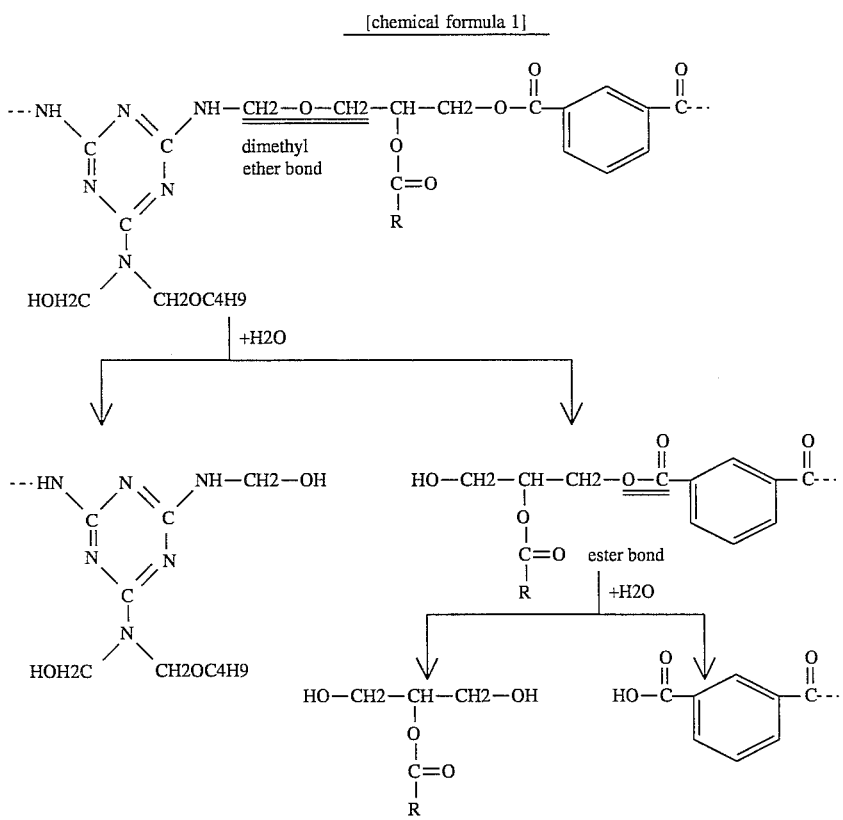

[chemical formula 1]

What is claimed is:

1. A process for reclaiming waste plastics having an urethane paint film or an amino resin paint film on a base resin, comprising the steps of subjecting the paint film to hydrolysis treatment to decompose the paint film into low molecular weight hydrolysis products, kneading the plastics and resulting hydrolysis products to disperse the hydrolysis products in the base resin and recovering a reclaimed waste plastics product suitable for molding.

2. The process for reclaiming the waste plastics having the paint film according to claim 1, wherein the hydrolysis treatment is conducted by immersing the waste plastics having the paint film in a treating liquid and heating the plastics to a temperature not more than a melting point of the plastics.

3. The process for reclaiming the waste plastics having the paint film according to claim 1, wherein the hydrolysis treatment is conducted by immersing the waste plastics having the paint film in a treating liquid and heating the plastics above a melting point of the plastics.

4. The process for reclaiming the waste plastics having the paint film according to claim 1, wherein the hydrolysis treatment is conducted by heating the waste plastics having the paint film to a temperature not more than a melting point of the plastics in the presence of vapor of a treating liquid.

5. The process for reclaiming the waste plastics having the paint film according to claim 1, wherein the hydrolysis treatment is conducted by heating the waste plastics having the paint film to a temperatures above a melting point of the plastics in the presence of vapor of a treating liquid.

6. The process for reclaiming the waste plastics having the paint film according to claim 1, wherein the hydrolysis treatment is conducted by melting and kneading the waste plastics having the paint film at a temperature above a melting point of the plastics, while a treating liquid is added to the plastics.

7. The process for reclaiming the waste plastics having the paint film according to claim 1, wherein there is employed in the hydrolysis treatment a treating liquid comprising water, alcohol or a mixture thereof.

8. The process for reclaiming waste plastics having the paint film according to claim 7, wherein the treating liquid includes a catalyst selected from the group consisting of acids, alkalies, metallic salts, organic salts and activated clay.

9. The process for reclaiming the waste plastics having the paint film according to claim 8, wherein the treating liquid includes an acid or an alkali in an amount of from 0.1 to 10% by weight.

10. The process for reclaiming the waste plastics having the paint film according to claim 1, wherein the hydrolysis treatment is conducted under applied pressure.

11. The process for reclaiming the waste plastics having the paint film according to claim 1, wherein the hydrolysis treatment is conducted under ambient pressure.

12. The process for reclaiming the waste plastics having the paint film according to claim 1, wherein said base resin is a thermoplastic resin selected from the group consisting of polypropylene, elastomer modified polypropylene, polyethylene, ABS resin, AS resin, polyacetal resin, polyphenylene oxide and mixtures thereof.

13. The process for reclaiming the waste plastics having the paint film according to claim 1, wherein said amino resin paint film is one selected from the group consisting of polyester-melamine paint films and acrylic-melamine paint films.

14. The process for reclaiming the waste plastics having the paint film according to claim 7, wherein said acid is one selected from the group consisting of hydrochloric acid, sulfuric acid, phosphoric acid, acetic acid, oxalic acid and tartaric acid; and said alkali is one selected from the group consisting of sodium hydroxide, potassium hydroxide and sodium alcoholates.

15. The process for reclaiming the waste plastics having the paint film according to claim 2, wherein said treating liquid is water.

16. The process for reclaiming the waste plastics having the paint film according to claim 2, wherein said treating liquid is alcohol.

17. The process for reclaiming the waste plastics having the paint film according to claim 16, wherein said alcohol is one selected from the group consisting of methanol, ethanol, propanol, ethylene glycol, methyl cellosolve and ethyl cellosolve.

18. A process for reclaiming waste plastics having a paint film comprising the steps of:

pulverizing a plastic molding comprising a base resin having a paint film thereon, hydrolyzing the paint film on the resulting pulverized material by immersing the pulverized material in a treating liquid, and kneading the resulting pulverized material subjected to the hydrolysis to disperse the products of the hydrolysis in the base resin.

19. A process for reclaiming waste plastics having an urethane paint film or an amino resin paint film on a base resin, comprising the steps of subjecting the paint film to hydrolysis treatment and then kneading the plastics having thereon the paint film subjected to the hydrolysis treatment to disperse the paint film subjected to the hydrolysis treatment finely and uniformly in the base resin so that the resulting dispersed paint film has a particle size of about several micrometers, and recovering a reclaimed waste plastics products suitable for molding.

* * * * *